US007984304B1

(12) United States Patent
Waldspurger et al.

(10) Patent No.: US 7,984,304 B1
(45) Date of Patent: Jul. 19, 2011

(54) DYNAMIC VERIFICATION OF VALIDITY OF EXECUTABLE CODE

(75) Inventors: Carl A. Waldspurger, Atherton, CA (US); Ole Agesen, Palo Alto, CA (US); Xiaoxin Chen, Fremont, CA (US); John R. Zedlewski, San Francisco, CA (US); Tal Garfinkel, Granite Bay, CA (US)

(73) Assignee: VMware, Inc., Palo Alto, CA (US)

( * ) Notice: Subject to any disclaimer, the term of this patent is extended or adjusted under 35 U.S.C. 154(b) by 957 days.

(21) Appl. No.: 10/791,602

(22) Filed: Mar. 2, 2004

(51) Int. Cl.
G06F 11/30 (2006.01)
G06F 12/14 (2006.01)

(52) U.S. Cl. ............ 713/187; 726/24; 726/25; 717/124; 717/126; 717/127

(58) Field of Classification Search .................. 713/187; 726/23, 24; 717/124, 126, 127
See application file for complete search history.

(56) References Cited

U.S. PATENT DOCUMENTS

| | | | | |
|---|---|---|---|---|
| 5,414,833 A * | 5/1995 | Hershey et al. | ................ | 726/22 |
| 5,440,723 A * | 8/1995 | Arnold et al. | ................ | 714/2 |
| 5,696,822 A * | 12/1997 | Nachenberg | ................ | 726/24 |
| 5,826,013 A * | 10/1998 | Nachenberg | ................ | 726/24 |
| 5,919,257 A * | 7/1999 | Trostle | ................ | 726/22 |
| 5,964,889 A * | 10/1999 | Nachenberg | ................ | 714/25 |
| 6,021,510 A * | 2/2000 | Nachenberg | ................ | 714/38 |
| 6,094,731 A * | 7/2000 | Waldin et al. | ................ | 714/38 |
| 6,111,517 A * | 8/2000 | Atick et al. | ................ | 340/5.83 |
| 6,122,738 A * | 9/2000 | Millard | ................ | 713/187 |
| 6,122,739 A * | 9/2000 | Kutaragi et al. | ................ | 726/32 |
| 6,148,401 A * | 11/2000 | Devanbu et al. | ................ | 713/170 |
| 6,151,618 A * | 11/2000 | Wahbe et al. | ................ | 718/1 |
| 6,275,938 B1 * | 8/2001 | Bond et al. | ................ | 726/23 |
| 6,275,939 B1 * | 8/2001 | Garrison | ................ | 726/6 |
| 6,338,141 B1 * | 1/2002 | Wells | ................ | 726/24 |
| 6,357,008 B1 * | 3/2002 | Nachenberg | ................ | 726/24 |
| 6,381,698 B1 * | 4/2002 | Devanbu et al. | ................ | 713/170 |
| 6,397,242 B1 * | 5/2002 | Devine et al. | ................ | 718/1 |
| 6,651,080 B1 * | 11/2003 | Liang et al. | ................ | 718/1 |
| 6,678,825 B1 * | 1/2004 | Ellison et al. | ................ | 726/17 |
| 6,697,810 B2 * | 2/2004 | Kumar et al. | ................ | 707/10 |
| 6,763,466 B1 * | 7/2004 | Glover | ................ | 726/24 |

(Continued)

OTHER PUBLICATIONS

Mendel Rosenblum, Stephen A. Herrod, Emmett Witchel, Anoop Gupta; Complet Computer System Simulation: The SimOS Approach; Stanford Universit; IEEE Parallel & Distributed Technology; 1995; pp. 34-43.*

Primary Examiner — Edan Orgad
Assistant Examiner — James Turchen
(74) Attorney, Agent, or Firm — Jeffrey Pearce

(57) ABSTRACT

Computer-executable instructions in a computer are verified dynamically, after they have been identified for submission for execution, but before they are actually executed. In particular, for at least one current instruction that has been identified for submission to the processor for execution, an identifying value, for example, a hash value, is determined for a current memory block that contains the current instruction. The identifying value of the current memory block is then compared with a set of reference values. If the identifying value satisfies a validation condition, then execution of the current instruction by the processor is allowed. If the validation condition is not satisfied, then a response is generated: In the common case, execution of the current instruction is not allowed, or some other predetermined measure is taken.

71 Claims, 4 Drawing Sheets

U.S. PATENT DOCUMENTS

| | | | |
|---|---|---|---|
| 6,775,780 B1 * | 8/2004 | Muttik | 726/24 |
| 6,851,057 B1 * | 2/2005 | Nachenberg | 726/24 |
| 6,968,461 B1 * | 11/2005 | Lucas et al. | 726/22 |
| 6,973,577 B1 * | 12/2005 | Kouznetsov | 726/25 |
| 6,981,176 B2 * | 12/2005 | Fruehling et al. | 714/11 |
| 7,010,698 B2 * | 3/2006 | Sheymov | 713/194 |
| 7,069,583 B2 * | 6/2006 | Yann et al. | 726/4 |
| 7,082,615 B1 * | 7/2006 | Ellison et al. | 726/26 |
| 7,093,135 B1 * | 8/2006 | Radatti et al. | 713/188 |
| 7,093,239 B1 * | 8/2006 | van der Made | 717/135 |
| 7,117,488 B1 * | 10/2006 | Franz et al. | 717/144 |
| 7,146,305 B2 * | 12/2006 | van der Made | 703/22 |
| 7,181,768 B1 * | 2/2007 | Ghosh et al. | 726/23 |
| 7,188,367 B1 * | 3/2007 | Edwards et al. | 726/24 |
| 7,236,610 B1 * | 6/2007 | Luo et al. | 382/100 |
| 7,367,057 B2 * | 4/2008 | Das et al. | 726/24 |
| 7,519,997 B2 * | 4/2009 | Shipp | 726/24 |
| 7,565,522 B2 * | 7/2009 | Sastry et al. | 713/2 |
| 7,603,704 B2 * | 10/2009 | Bruening et al. | 726/22 |
| 7,631,356 B2 * | 12/2009 | Hatlelid et al. | 726/24 |
| 7,716,495 B2 * | 5/2010 | Shupak et al. | 713/193 |
| 2002/0077782 A1 * | 6/2002 | Fruehling et al. | 702/185 |
| 2003/0023863 A1 * | 1/2003 | El Fassi et al. | 713/200 |
| 2003/0126590 A1 * | 7/2003 | Burrows et al. | 717/154 |
| 2005/0108562 A1 * | 5/2005 | Khazan et al. | 713/200 |

* cited by examiner

DYNAMIC VERIFICATION OF VALIDITY OF EXECUTABLE CODE

BACKGROUND OF THE INVENTION

1. Field of the Invention

This invention relates to the general field of computer security, in particular, to detection of unauthorized, altered or potentially malicious executable code.

2. Description of the Related Art

Terms such as "virus," "worm," "Trojan horse," and "spyware" have entered the vocabulary of ordinary computer users, not to describe medical conditions or tales of classic warfare and espionage, but rather to describe weaknesses in software. Modern computer users are also often—too often—confronted with the need to update ("patch") faulty software, often precisely in response to one of the above-mentioned weaknesses that a hacker might exploit. Even absent malicious activity, some software that is loaded into a computer is or becomes corrupted, meaning that it is no longer the same as what first was or should have been installed. In general, all of these problems stem from the presence of executable code that is not as it should be, or that should not be present in the computer at all.

In response, prudent computer users typically install other software to detect and remove malicious code such as viruses, worms, etc. Still other software tries to detect and repair "bugs" not only in installed programs, but often also in system-level code.

One problem with conventional methods for detecting and eliminating unwanted or faulty code is that they are typically reactive, meaning that they rely on up-to-date information identifying suspicious code. Such information often comes too late, however. For example, a virus may infect millions of computers before it is identified and analyzed and included in a data base of virus definitions, and even then users must know to download the new definitions, assuming this is even possible with the virus in their systems. Another problem is that such detection and repair software usually functions as a kind of "batch" process in that it operates on entire files at a time when these files are not being actively used or modified.

One other way that users try to protect their systems from infection by viruses or corruption of files is to isolate sensitive files (or memory regions) in some way that they cannot be accessed or modified except by trusted users or sub-systems. Isolation may be accomplished using all software or with hardware support. Isolation alone does nothing to detect and prevent malicious code from being executed if it has already somehow made it into the "safe" area, however. Moreover, a virus that jumps to and executes outside the protected memory region may be able to avoid detection.

One form of "isolation" that is becoming more widely considered involves hardware support in the form of access control bits, which prevent execution of code on a given page of memory. However, the access control bits alone do not guarantee that what is in the corresponding page is in fact safe. For one thing, if malicious code is found within the boot loader, or within certain components of the operating system, then it could affect the access control bits and thereby defeat what security they otherwise provide. Moreover, the contents of a page are no safer than they were when they were first downloaded, and are only as trustworthy as the original source, digitally signed or not. Even if such hardware-based security could be perfected, however, it would still not benefit users of other hardware architectures that do not provide access control bits.

A secure or "trusted" computing platform should guarantee that it executes only permissible code. For example, administrators of public (or corporate) computer terminals might want to restrict users to running only a pre-installed set of approved applications. On a smaller scale, parents might want to ensure that their home computers execute only applications they know to be appropriate for children.

A common way to increase the security of such "trusted" computing platforms is to employ cryptographic techniques to "attest" to the validity of code before executing it. The traditional approach of boot-time verification has been implemented in several commercially available products, including gaming platforms and some personal computers such as the IBM Thinkpad with the TCPA chip. This approach, while useful, does nothing to guarantee the validity of currently executing code. For instance, the user may have booted permissible software that is later compromised and hijacked to run other, non-permissible code. For example, Microsoft Corporation suffered great embarrassment when a hacker exploited a bug in the attested game "007: Agent Under Fire" running on Microsoft's "secure" Xbox gaming platform to cause it to load the Linux operating system.

A method for run-time verification is discussed in "A Virtual Machine Introspection Based Architecture for Intrusion Detection," Tal Garfinkel and Mendel Rosenblum, The Proceedings of the Network and Distributed Systems Security Symposium (February 2003). Garfinkel and Rosenblum use virtualization software developed by VMware, Inc., of Palo Alto, Calif., to aid in the inspection of running code by periodically scanning the code section of programs loaded into memory and hashing to verify that the code has not been tampered or corrupted.

One weakness of this system by Garfinkel and Rosenblum is that it does not ensure that the code currently being executed, as opposed merely to being part of a loaded program, is safe. Whereas their system inspects the code segments of processes known to be running, a buffer overflow exploit (one of the most common attacks) will not modify the segment, but will simply jump to a new memory region and begin executing, completely bypassing the security provided by the system. Still another disadvantage of the disclosed system is that it requires support incorporated into the guest operating system to achieve this.

What is needed is therefore a system and a related method of operation that can verify the validity of currently executing code without requiring specific knowledge of what entity the code belongs to and that cannot be bypassed by a simple jump in memory. The new solution should preferably be useful on a variety of architectures, both those that have hardware support (such as access control bits) and those that do not. This invention provides such a new solution.

SUMMARY OF THE INVENTION

The invention implements dynamic verification of the validity of computer-executable instructions. In particular, the invention implements dynamic verification in a computer that includes at least one processor that executes instructions stored in a memory, which is organized into separately addressable memory blocks. For at least one current instruction that has been identified for submission to the processor for execution, a verification engine according to the invention determines an identifying value for a current memory block that contains the current instruction. The identifying value of the current memory block is then compared with a set of reference values. If the identifying value satisfies a validation condition, then execution of the current instruction by the processor is allowed; if not, then a response is generated. The current instruction is thereby verified dynamically, when it is marked for execution, but before it is actually executed.

According to one aspect of the invention, a "white list" is made available to the verification engine. Accordingly, at least one validation entry is included in the set of reference values corresponding to at least one identifying value for predetermined contents of a known, valid memory block. The validation condition is then that the identifying value of the current memory block matches any validation entry in the set of reference values.

According to another aspect of the invention, a "black list" is made available to the verification engine. Accordingly, at least one invalidation entry is included in the set of reference values corresponding to at least one identifying value for predetermined contents of a known invalid memory block. The validation condition is then that the identifying value of the current instruction differs from all invalidation entries in the set of reference values.

Either or both a white list and a black list may also be included, either locally, stored in memory and/or remotely and made accessible to the verification engine over a network.

The step of determining the identifying value of the current memory block preferably comprises computing a hash value as a function of at least a sub-set of the contents of the current memory block. Each reference value is then computed as a hash value of at least a sub-set of a known, reference memory block. Partial hashing may also be used, in which the respective hash values are computed based on only part of the contents of both the current and the reference memory blocks. The part of the contents used for hashing may be isolated, for example, using a mask such as a bit mask.

For each of a plurality of memory blocks, an indication may be entered in a structure as to whether each respective block is validated. For each current instruction from a memory block whose structure indication is that it is validated, the system may allow execution of the current instruction to proceed directly. The structure used to hold the indications may be either in hardware, such as hardware attribute indicators, or software, or a combination of both. One example of hardware attribute indicators that can be used are entries in a translation lookaside buffer.

One way to use the structure indicating validity or invalidity of a memory block is to perform the steps of determining the identifying value for the current memory block and comparing the identifying value of the current memory block with a set of reference values only for current instructions located in memory blocks not indicated in the structure as being validated. If the identifying value of a current memory block not indicated as being validated satisfies the validation condition, then the corresponding structure indication is set to indicate that it is validated. Upon sensing modification of any such memory block, its indication in the structure can then be set to indicate that the memory block is not validated.

Rather than or in addition to verifying the memory block of the current instruction, it is also possible according to the invention to determine a branch history for the current instruction and then to check whether the memory blocks in which instructions in the branch history are located are validated. The validation condition then includes the requirement that each checked memory block in the branch history be validated.

Dynamic validation may be performed only after occurrence of some triggering event. Examples of such triggering events include the writing of at least one new unit of code or data to any physical component within the computer; the attempted execution of any instruction located on any unverified memory block; and the attempted execution of any instruction located on any unverified memory block of newly installed software. Dynamic verification may also be triggered depending on the identity of the user of the computer who has caused submission of the current instruction or on the context in which the current instruction is submitted for execution. One example of a context is a level of security clearance associated with the computer, a user of the computer, or a program of which the current instruction is a part.

Dynamic verification may also be performed on only a sampled subset of current instructions. Sampling may be temporally, sequential, spatial, etc.

Any, of any combination, of a wide range of responses may be generated in the case that the validation condition is not satisfied. Examples of responses include: suspending execution of a software entity with which the current memory block is associated; posting a message to a user, system administrator, or other predetermined recipient; and/or, in systems including a virtual machine whose execution can be switched by an intermediate software layer between direct execution and binary translation, switching execution to binary translation and/or checkpointing the state of the virtual machine.

The same response need not be used for each memory block. Rather the invention provides the possibility of generating the response associated with the memory block in which the current instruction is located.

The invention may also be used to track which programs are being executed within the computer by associating the reference values with respective predetermined programs. A match between the identifying value of the current memory block with any validation entry in the set of reference values will then indicate execution of the corresponding one of the predetermined programs.

In a computer that includes a virtual machine (VM) running on an underlying hardware platform via an intermediate software layer operable to switch the virtual machine between a direct execution mode and a binary translation mode, the invention also provides the possibility of verifying the validity of VM-issued instructions in conjunction with binary translation of any of the VM-issued instructions.

DETAILED DESCRIPTION

Introduction

In broadest terms, the invention provides a system and method of operation for verifying the validity of code dynamically by comparing the contents of a unit (or sub-unit) of memory (such as a page) that contains code currently being executed, or scheduled to be executed, against one or more sets of information that distinguish permissible code from impermissible. The invention thus implements a "verify-before-execute" mechanism. The invention is not restricted to any particular hardware architecture, and may be incorporated to advantage in virtualized computer systems.

General System Configuration

Figure 1:
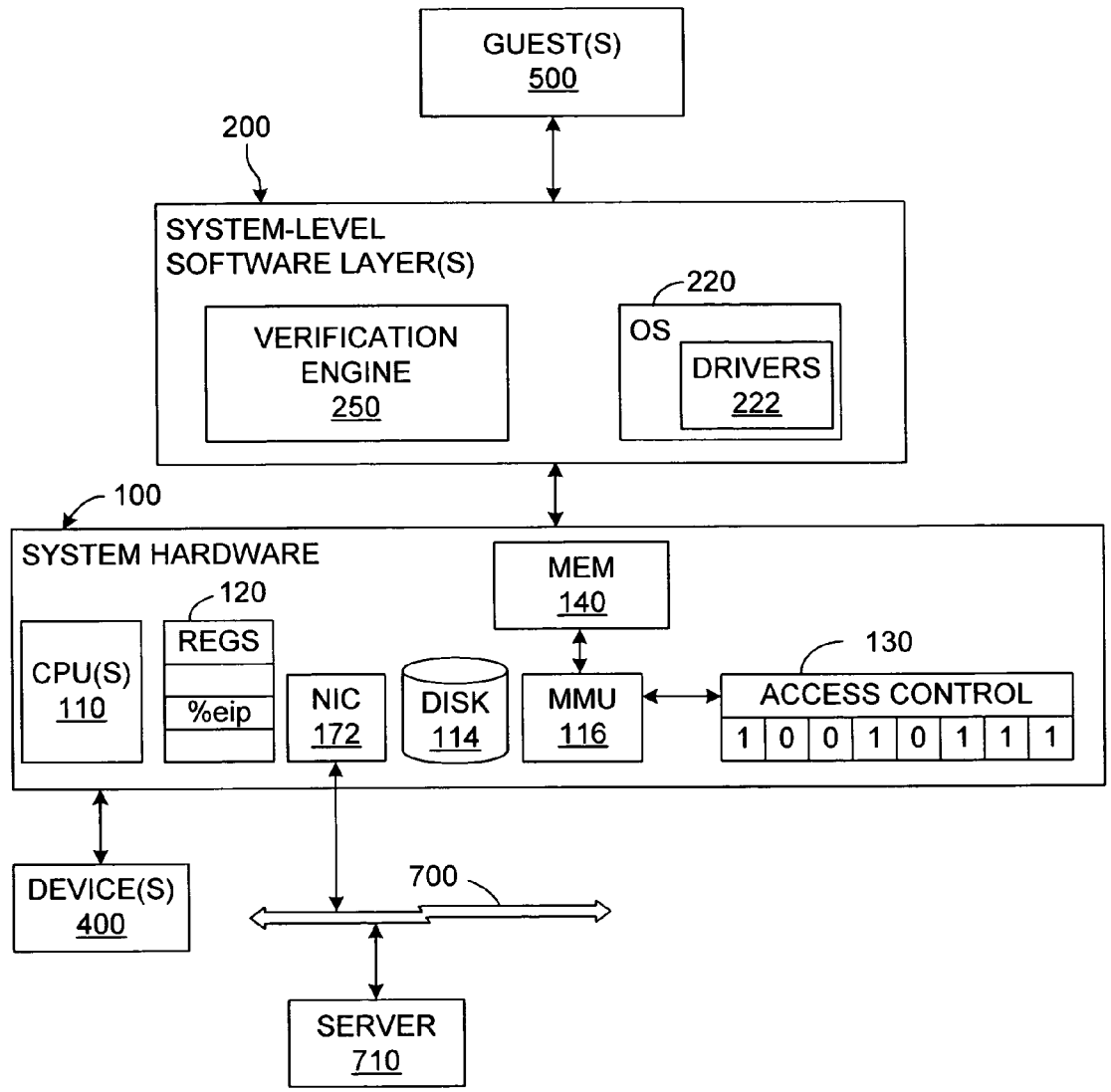
FIG. 1 illustrates the main software and hardware components of the invention.

FIG. 1 illustrates one example of a system in which the invention may be incorporated. A system hardware platform 100 includes one or more processors (CPUs) 110, system memory 140, and a storage device, which will typically be a disk 114. The system memory 140 will typically be some form of high-speed RAM, whereas the disk (one or more) will typically be a non-volatile ("persistent") mass storage device. The hardware 100 will also include other conventional mechanisms such as at least one memory management unit MMU 116 (for example, one per processor), and one or more conventional network connection device(s) 172 (such as a network adapter or network interface card—"NIC") for transfer of data between the various components of the system and one or more external systems such as servers 710 via a bus or network 700. The system hardware 100 will also typically include one or more registers 120 (usually, per processor), such as at least one instruction pointer % eip, which will usually be part of a respective one of the processor(s) 110.

At least one system software layer 200 includes a host operating system 220, or some software that performs the hardware-interface, resource-allocating and control functions of an operating system, which will include drivers 222 as needed for various connected devices 400. A display device and input devices such as a keyboard, mouse, trackball, touchpad, etc., (not shown) are usually also included among the devices for obvious purposes. The operating system (OS) 220 may be any known OS and will therefore have all typical components.

Unique to the invention is a verification engine 250, which is shown as being part of the system software layer(s) 200. It would be possible to incorporate the verification engine into the OS 220 itself, but in most implementations of the invention it is anticipated that the verification engine will be a separate software module; it is in any event shown as a separate module for the sake of ease of illustration and explanation.

One or more guest(s) 500 run on the hardware 100 via (or as part of) the system software layer 200. A "guest" is any software entity (for example, a traditional OS process, a virtual machine, etc.) that is defined by or causes code to be retrieved from memory (for example, after having been loaded into memory from disk) and executed on any processor. The guests will typically (but not necessarily) be user-level applications in that all, or at least some, of their requests for system resources (including access to the memory 140 and disk 114) are mediated by the OS 220. In most systems, the guests are "applications." In implementations in which the invention is included in a virtualized computer system, one or more of the guests may be a virtual machine. An example of a virtualized computer system is described below. The invention may also be used, however, to verify the code even of software modules running at system level, even as part of the OS 220, or of any combination of software running at any level(s) as long as the memory units in which the respective code currently being or about to be executed is accessible to and observable by the verification engine 250.

Virtualized Embodiments

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer. Depending on how it is implemented, virtualization also provides greater security since it can isolate potentially unstable or unsafe software so that it cannot adversely affect the hardware state or system files required for running the physical (as opposed to virtual) hardware.

As is well known in the field of computer science, a virtual machine (VM) is a software abstraction—a "virtualization"—of an actual physical computer system. A virtual machine, which, in this system is the guest 500, is installed on a "host," such as the hardware platform 100. Two configurations are in general use—a "hosted" configuration, illustrated in FIG. 3, in which an existing, general-purpose operating system (OS) 220 forms a "host" OS that is used to perform certain I/O operations; and a non-hosted configuration, illustrated in FIG. 4, in which a kernel 800 customized to support virtual computers takes the place of the conventional operating system. The main components of these two configurations are outlined below. This invention works with either configuration.

Each VM 500 will have both virtual system hardware 501 and guest system software 502. The virtual system hardware typically includes at least one virtual CPU 510, virtual system memory 512, at least one virtual disk 514, and one or more virtual devices 540. Note that a disk—virtual or physical—is also a "device," but is usually considered separately because of its essential role. All of the virtual hardware components of the VM may be implemented in software using known techniques to emulate the corresponding physical components. The guest system software 502 includes a guest operating system 520 (which may simply be a copy of a conventional operating system), and drivers 522 as needed for the various virtual devices 540.

Each virtual CPU 510 will have an instruction pointer (% eip) just like a "real" CPU does, with the same function. As explained below, however, because of address translation, the values in the "virtual" instruction pointer will usually not be the same as those in the instruction pointer of the physical CPU.

If the VM is properly designed, then even though applications 503 running within the VM are running indirectly, that is, via the guest OS and virtual processor, they will act just as they would if run on a "real" computer, except for a decrease in running speed that will be noticeable only in exceptionally time-critical applications. Executable files will be accessed by the guest OS 520 from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines are well known in the field of computer science.

Some interface is usually required between a VM and the underlying host platform (in particular, the CPU 110), which is responsible for actually executing VM-issued instructions and transferring data to and from the actual memory 140 and storage devices 114. A common term for this interface is a "virtual machine monitor" (VMM), shown as component 600. A VMM is usually a thin piece of software that runs directly on top of a host, or directly on the hardware, and virtualizes at least some of the resources of the physical host machine. The interface exported to the VM is then the same as the hardware interface of the machine (or at least of some machine), so that the guest OS 520 cannot determine the presence of the VMM.

The VMM 600 also usually tracks and either forwards (to some form of operating system) or itself schedules and handles all requests by its VM for machine resources, as well as various faults and interrupts. An interrupt handling mechanism 630 is therefore included in the VMM. As is well known, in the Intel IA-32 ("x86") architecture, such an interrupt/exception handling mechanism normally includes an interrupt descriptor table (IDT), or some similar table, which is typically a data structure that uses information in the interrupt signal to point to an entry address for a set of instructions that are to be executed when the interrupt/exception occurs. In the Intel IA-64 architecture, the interrupt table itself contains interrupt handling code and instead of looking up a target address from the interrupt table, it starts execution from an offset from the start of the interrupt when a fault or interrupt occurs. Analogous mechanisms are found in other architectures.

Figure 3:
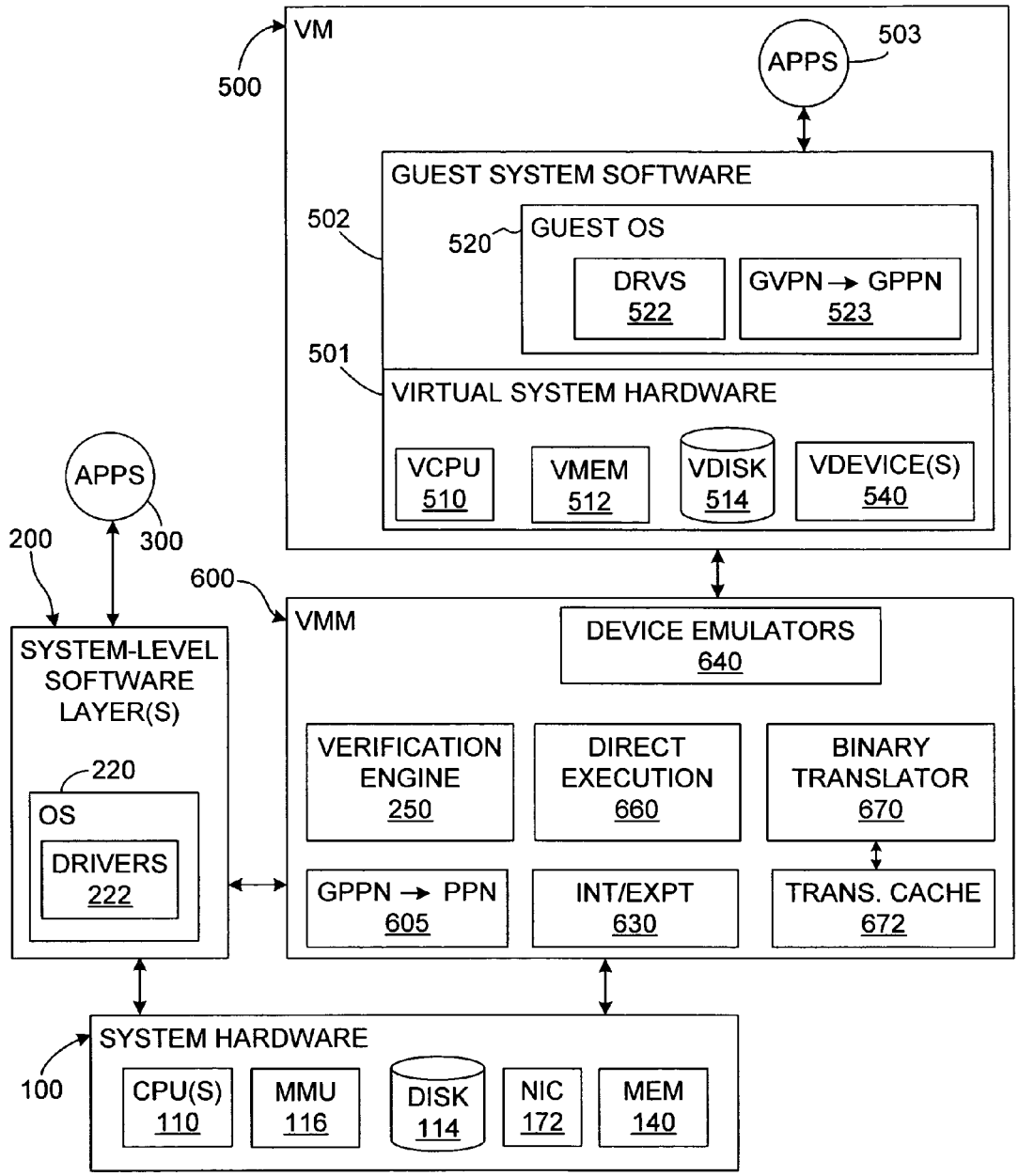
FIG. 3 shows one example of a virtualized computer system that incorporates the invention.

Although the VM (and thus the user of applications running in the VM) cannot usually detect the presence of the VMM, the VMM and the VM may be viewed as together forming a single virtual computer. They are shown in FIG. 3 as separate components for the sake of clarity. There may be several VM/VMM pairs (virtual computers) running on a common host; a single VM/VMM pair is shown in FIG. 3 for simplicity.

VMM transparency is not required by this invention; rather, the "verify-before-execute" mechanism of the invention may also be incorporated in so-called "para-virtualization" systems in which the guest OS is aware that it is being virtualized, and has an explicit interface to the VMM. In such systems, the VMM is sometimes referred to as a "hypervisor."

Moreover, the various virtualized hardware components such as the virtual CPU(s) 510, the virtual memory 512, the virtual disk 514, and the virtual device(s) 540 are shown as being part of the VM 500 for the sake of conceptual simplicity—in actual implementations these "components" are usually constructs or emulations exposed to the VM by the VMM, for example, as emulators 640. One advantage of such an arrangement is that the VMM may be set up to expose "generic" devices, which facilitate VM migration and hardware platform-independence.

Hosted Virtual Computers

The configuration illustrated in FIG. 3 is used in the Workstation product of VMware, Inc., of Palo Alto, Calif. In this configuration, the VMM 600 is co-resident at system level with the host operating system 220 such that both the VMM and the host OS can independently modify the state of the host processor. However, the VMM calls into the host OS via a special driver 222 and a dedicated one of the user-level applications 300 to have the host OS perform certain I/O operations on behalf of the VM. The virtual computer in this configuration is thus hosted in that it runs on an existing host hardware platform 100 together with an existing host OS 220. A hosted virtualization system of the type illustrated in FIG. 3 is described in U.S. Pat. No. 6,496,847 (Bugnion, et al., "System and Method for Virtualizing Computer Systems," 17 Dec. 2002), which is incorporated here by reference.

Non-Hosted Virtual Computers

Figure 4:
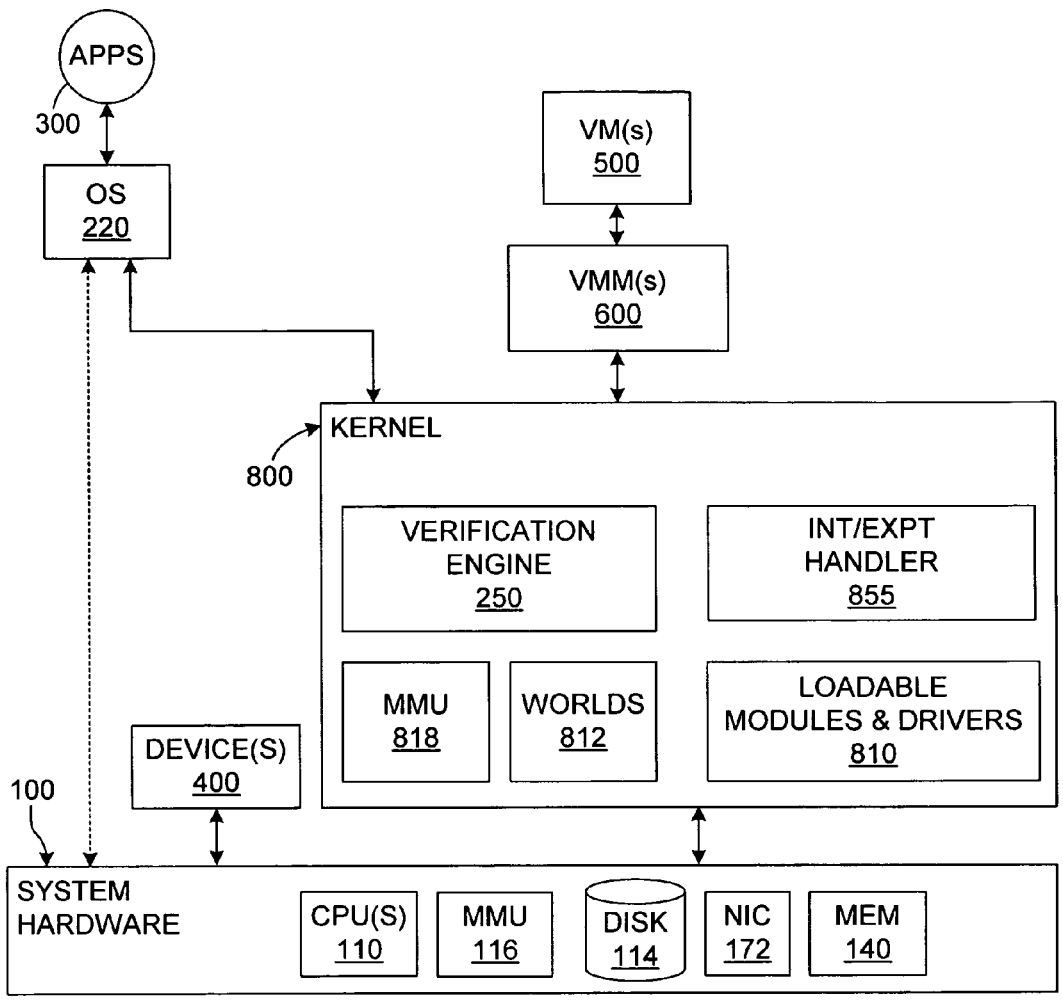
FIG. 4 shows another example of a virtualized computer system that incorporates the invention, but which includes a kernel that provides support for virtualization.

In other, "non-hosted" virtualized computer systems, a dedicated kernel 800 takes the place of and performs the conventional functions of the host OS, and virtual computers run on the kernel. FIG. 4 illustrates such a configuration, with a kernel 800 that serves as the system software for the VM/VMM pairs, only one of which is shown, for the sake of simplicity. Compared with a system in which VMMs run directly on the hardware platform 100, use of a kernel offers improved performance because it can be co-developed with the VMMs and be optimized for the characteristics of a workload consisting of VMMs. Moreover, a kernel can also be optimized for I/O operations and it facilitates provision of services that extend across multiple VMs (for example, for resource management). The ESX Server product of VMware, Inc., has such a configuration.

Because the VMs and VMMs run on the kernel 800, one could of course say that the kernel is a "host." On the other hand, the kernel 800, such as in ESX Server, is more dedicated to and optimized for use in virtualized systems as opposed to being an unmodified or only slightly modified standard OS that is used primarily for other purposes. The term "non-hosted" is used here simply to indicate this distinction. It is to be understood, however, that the distinction could be blurred in a system configured as in FIG. 3, but with the operating system 220 (or, indeed, the hardware platform 100) more extensively modified to support virtualization. As is made clearer below, the verification engine 250 may be located in different components, so this invention does require a clear distinction between the concepts of a "hosted" versus a "non-hosted" architecture.

At boot-up time, an existing operating system 220 (which may be of the same type as the host OS 220 in the configuration of FIG. 3) may be at system level and the kernel 800 may not yet even be operational within the system. In such case, one of the functions of the OS 220 may be to make it possible to load the kernel 800, after which the kernel runs on the native hardware 100 and manages system resources using such components as various loadable modules and drivers 810, a memory management unit 818, at least one interrupt and exception handler 855, etc.

In effect, the kernel, once loaded, displaces the OS 220. Thus, the kernel 800 may be viewed either as displacing the OS 220 from the system level and taking this place itself, or as residing at a "sub-system level." When interposed between the OS 220 and the hardware 100, the kernel 800 essentially turns the OS 220 into an "application," which has access to system resources only when allowed by the kernel 800. The kernel then schedules the OS 220 as if it were any other component that needs to use system resources.

The OS 220 may also be included to allow applications 300 unrelated to virtualization to run; for example, a system administrator may need such applications to monitor the hardware 100 or to perform other administrative routines. The OS 220 may thus be viewed as a "console" OS (COS) or "service console." In such implementations, the kernel 800 preferably also includes a remote procedure call (RPC) mechanism and/or a shared memory area to enable communication, for example, between the VMM 600 and any applications 300 installed to run on the COS 220.

The console OS 220 in FIG. 4 is labeled the same as the host OS 220 in FIG. 3. This is to illustrate that the OS 220 kernel may usually be unmodified, or at most only slightly modified, in order to support either the host and non-hosted virtualized computers. In fact, at least in the virtualization products of VMware, Inc., "off-the-shelf" or only slightly modified commodity operating systems such as Linux and Microsoft Windows may be used as the host or console operating systems. In the ESX Server product of VMware, for example, the console OS is a modified Linux distribution.

The kernel 800 handles not only the various VM/VMMs 500/600, but also any other applications running on the kernel, as well as the COS 220 as entities that can be separately scheduled. Each schedulable entity may be referred to as a "world," which contains a thread of control, an address space, machine memory, and handles to the various device objects that it is accessing. Worlds, represented in FIG. 4 within the kernel 800 as module 812, are stored in a portion of the memory space controlled by the kernel. Each world also has its own task structure, and usually also a data structure for storing the hardware state currently associated with the respective world.

There will usually be different types of worlds: For example, one or more system worlds may be included, as well as idle worlds, one per CPU. Another world would be a console world associated with the COS 420. Depending on the implementation, either each virtual computer (VM/VMM pair) will constitute a world, or there will be a separate world for each virtual CPU.

Binary Translation Vs. Direct Execution

As is known, for example, from U.S. Pat. No. 6,397,242 (Devine, et al., 28 May 2002), which is incorporated here by reference, some virtualization systems allow VM instructions to run directly (in "direct execution" mode) on the hardware CPU(s) when possible. When necessary, however, VM execution is switched to the technique known as "binary translation," during which the VM is running in the VMM and the VM instructions are converted—translated—into a different instruction or instruction sequence, for example, to enable execution at a safe privilege level; if no emulation is needed, then original VM instructions may also be copied directly into a translation cache. The VMM 600 is therefore shown in FIG. 3 with a direct execution engine 660, a binary translator 670, and a translation cache 672 which holds the sequences of translated instructions; the VMM will generally also include these components in non-hosted systems.

In the system described in U.S. Pat. No. 6,397,242, for the sake of speed, VM instructions are normally allowed to execute directly. The privilege level of the physical CPU is, however, set such that the hardware platform does not execute VM instructions that require a more privileged level than the VM is set at. Instead, attempted execution of such an instruction causes the platform to issue a fault, which the VMM handles in part by executing a software module that causes switching of VM execution to binary translation. Direct execution is then resumed at a safe point in the VM instruction stream. This dual-execution mode feature may be used in both hosted and non-hosted configurations of the virtualized computer system.

Virtual and Physical Memory

As mentioned above, the address space of the memory 140 is partitioned into pages, regions, or other analogous allocation units. Applications address the memory 140 using virtual addresses (VAs), each of which typically comprises a virtual page number (VPN) and an offset into the indicated page. The VAs are then mapped to physical addresses (PAs), each of which similarly comprises a physical page number (PPN) and an offset, and which is actually used to address the physical memory 140. The same offset is usually used in both a VA and its corresponding PA, so that only the VPN needs to be converted into a corresponding PPN.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in region-based architectures or, indeed, in any architecture where relocatability is possible.

In architectures that provide access control bits, these bits are typically associated with virtual pages in translation lookaside buffer (TLB) entries. The hardware MMU enforces the access control bits during VPN→PPN translation in the system's translation lookaside buffer (TLB).

An extra level of addressing indirection is typically implemented in virtualized systems in that a VPN issued by an application 503 in the VM 500 is remapped twice in order to determine which page of the hardware memory is intended. The first mapping is provided by a mapping module 523 within the guest OS 520, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory 140 must ultimately be generated. A memory management module 605, located typically in the VMM 600, therefore performs the second mapping by taking the GPPN issued by the guest OS 520 and mapping it to a hardware (or "machine") page number PPN that can be used to address the hardware memory 140. This GPPN-to-PPN mapping may instead be done in the main system-level software layer (such as in a mapping module in a memory management unit in the kernel 800), depending on the implementation. From the perspective of the guest OS, the GVPN and GPPN might be virtual and physical page numbers just as they would be if the guest OS 520 were the only OS in the system. From the perspective of the system software, however, the GPPN is a page number that is then mapped into the physical memory space of the hardware memory as a PPN.

The addressable space of the disk(s) 114, and therefore also of the virtual disk(s) 514, is similarly subdivided into separately identifiable portions such as blocks or sectors, tracks, cylinders, etc. In general, applications do not directly address the disk; rather, disk access and organization are tasks reserved to the operating system, which follows some predefined file system structure. When the guest OS 520 wants to write data to the (virtual) disk 514, the identifier used for the intended block, etc., is therefore also converted into an identifier into the address space of the physical disk 114. Conversion may be done within whatever system-level software layer that handles the VM, either the VMM 600, the host OS 220 (under direction of the VMM), or in the kernel 800.

Memory Allocation Units

As is well known, in most modern computer architectures, system memory 140 is typically divided into individually addressable units or blocks commonly known as "pages," each of which in turn contains many separately addressable data words, which in turn will usually comprise several bytes. In Intel x86 systems, for example, each page comprises 4096 bytes. A page is also usually the minimum amount of memory that the operating system allocates or loads at a time; in particular, given a current instruction that is intended to be executed, a "page" is the minimum amount of memory that the system software loads from disk (or other storage device) in order for the instruction to be available for execution. This invention does not presuppose any particular page size, or even that the page size must be constant. Pages are identified by addresses commonly referred to as "page numbers;" other architectures have identifiers that are analogous to page numbers.

Because memory is typically much faster than non-volatile storage, especially a disk, when a unit of code is to be run, the OS 220 typically loads the code (including any necessary non-executable data) defining the entity from non-volatile storage into memory. The OS typically does this by faulting in each page lazily on demand as needed only when the page is accessed; this is commonly referred to as "demand paging". Alternatively, code may be downloaded for execution directly into memory, for example from the Internet.

Of course, instructions are usually executed sequentially, one at a time, or a few at a time, depending on the type and number of processors. (Many common single processors can execute multiple instructions concurrently in different functional units). The location in memory of the current (or next) instruction, that is, its address, is identified in the instruction pointer % eip, or is in some way computed from the value stored in the instruction pointer. An additional data structure (such as a segment descriptor, in systems with segmented memory architectures) may be used, for example, to identify in which memory allocation unit (such as a page) the current instruction is located, or the instruction itself may include a page (or other unit) identifier. Moreover, when the invention is used in virtualized computer systems, it may not be necessary to inspect the hardware instruction pointer at all; rather, either a virtualized instruction pointer could be inspected, or a separate instruction pointer could be maintained. All that is required by the invention is some way to identify where a current instruction is located, either in virtual or physical memory. These concepts are well known, but are also summarized below.

This invention is able to check the validity of code dynamically, that is, at the time it is to be executed, regardless of whether it is part of a program known to be running as opposed to simply being resident in memory. Consequently, the invention must ensure that an instruction is safe to execute before it is actually passed to the processor for execution. For the sake of simplicity, it is therefore assumed that the % eip (together with any additional hardware and software structures, as needed by the given architecture) holds information identifying the location of the next instruction that the processor is to execute, or that this information can be determined using known methods.

The relevant point for understanding this invention is that the memory allocation unit in which the current (or next) executable instruction or group of instructions is located is indicated by some identifier (such as certain bits, in particular, arranged as a page number) either within the instruction address, in some other data structure, or in both in combination, and that this identifier is accessible to the verification engine 250 either directly, or indirectly, as a result of a request for the identifier issued to some other entity or hardware that does have access. Without loss of generality, it is therefore assumed by way of example below that the memory is arranged in pages, each of which is identified by a page number.

Code

In this application, unless otherwise made clear, the term "code" is meant to include all digital information either representing computer-executable instructions, or non-executable data used to complete execution of instructions, such as instruction parameters and constants, written to either a volatile memory device or to a persistent mass-storage device. This definition is consistent with the way in which information is typically stored in devices—all bytes, words, etc., are stored in the same form. With respect to code storage, the only assumption is that the memory area(s) in which the code is stored is arranged in allocation units (such as memory pages) that are uniquely identifiable (for example, by page number). An optional mechanism for dealing with the consequences of including non-constant data on the same page as code is discussed below; this same mechanism may be used as well to select only a subset of code or other invariant information on a page for processing according to the invention.

Moreover, it should be possible to associate with a page, in either a hardware or a software structure, some indication of whether the code on that page is "safe," "valid," "permissible," etc., on the one hand, or "unsafe," "invalid," "impermissible," etc., on the other hand. The mechanism used to provide such indication may be either part of the existing system (such as hardware access control bits), or provided by the invention itself, as explained below.

Overview of Dynamic Validation

There are several ways to implement the system according to the invention, depending on the level of hardware support provided by the underlying hardware platform 100. In general, however, the following four major procedural steps are carried out by corresponding software modules within the verification engine 250 (see FIG. 2):

Some event or routine is used to initiate code verification (module 252)

Code of interest is identified (module 253)

The identified code is analyzed to determine whether it is permissible (module 254)

Depending on the analysis, the verification engine generates a response (module 258).

The various modules 252, 253, 254, 258 will normally all be implemented as sections (for example, sub-routines) of the computer-executable code that defines the verification engine 250 as a whole; other programming techniques may be used instead, of course. Note that some of the modules, such as the initiation module 252 and the response module 258 may interact with other software or hardware components in order to receive signals such as on/off signals, interrupts, etc. The function of each module, and various alternatives for each procedure step, are described below.

Initiation

There are different ways to activate the verification engine 250, that is, to cause it to begin verifying code dynamically. One way is of course simply always to run the verification engine for all executed code. For example, the verification engine 250 could be loaded and run as part of the start-up or boot routine of the entire system. Alternatively, a standard icon or menu item could be included in the existing graphical user interface of the computer system, which the user could then use to activate the verification engine 250. An Application Program Interface (API) could also be supplied by the verification engine to allow other programs to control initiation. Automatic activation at start-up and selective activation are already in use for such background programs as virus scanners, and similar initiation techniques may be used with the verification engine 250 according to the invention.

Because code verification does impose some overhead, it may be preferable, however, to include some form of selective verification with respect to which code is checked, or when, or both. Again, standard techniques may be used. For example, known techniques could be used to enable the user (including a system administrator) to select which entities are to be monitored, that is, to have their code dynamically verified, and when to initiate monitoring.

Similarly, the system could verify code running only in one mode or another. For example, only privileged, kernel-mode code and not non-privileged, user-mode code could be verified. As a special case of this, it would be possible to verify only code that has been generated as a result of binary translation.

Code verification could also be initiated automatically, but on the occurrence of initiation conditions not specified by the user. For example, if it is assumed that code already residing within the system is valid, or that code already verified in the system cannot be modified, then there may be no need for subsequent dynamic verification. The verification engine 250 could thus be activated as soon as any new code is either installed on disk—either physically or via downloading—or loaded into memory. To avoid the need to determine the nature of newly installed or loaded information, the verification engine 250 could instead be activated any time any new pages or other units of code and/or data are written to any device in the system, be it disk or memory, although this will in most implementations lead to a high percentage of needless and therefore wasteful page verifications.

Identification

Once the verification engine 250 is initiated, the engine identifies which code is of interest, that is, which code needs to be verified. Because it would be meaningless to verify each individual instruction as it is to be executed (even malicious code will typically be composed of "valid" individual instructions), verification is preferably conducted on code blocks, that is, allocation units (one or more) of memory in which the code currently to be executed is located.

Code verification may be done at any level of granularity, although the more instructions are verified as a block the more precise and discriminating the verification routine will be. On the other hand, verifying too large a block of code at once introduces inefficiencies of its own. For one thing, the verification function (see below) used will take longer to evaluate; for another, additional bookkeeping routines and structures will be needed if code blocks are not the same as the standard allocation units used by the operating system. Furthermore, the larger the block, the greater the likelihood will be not only that non-constant data will be included but also that code will be included in the verification that is seldom or never run; both could lead to false "positives" and trigger a response (see below) unnecessarily. The preferred block size for verification is therefore the same as the standard memory allocation unit of the operating system. In x86 architectures, this standard allocation unit is a page; this granularity is therefore assumed here by way of example, but without loss of generality.

The question then becomes: Given that the current instruction is located in a particular page, is this page (and thus the instruction) "safe" or does it need to be verified? The invention provides several answers to this question, the "best" of which will depend on the needs of each application of the invention and can be selected using normal design considerations.

Before this question can be answered, however, there must be some way to define "safe" in a way that the verification engine 250 can use. Note that "safe" here does not mean "error-free" in the sense that correct execution will not lead to undesired results. For example, certain software may contain many "bugs," which, in some cases, may be corrected by installing various "patches." Nonetheless, such software may be considered to be valid, that is, "safe," in the sense that they consist of a set of instructions and data and intentionally delivered for use as they are. Similarly, a user may install code from a trusted source either from a physical medium or through downloading or other network transfer despite having various known or unknown bugs.

Assume that either the user, a system administrator, or even a trusted remote entity defines some set of pages as being safe. For example, all the executable files of all versions of a particular program could be assumed to be valid, regardless of how error-prone they are likely to be. This is the same as saying that all pages containing the code of the particular program are valid.

Another way to determine valid pages of code is to start not by identifying particular programs, but rather by a particular system state. For example, it could be assumed that all pages on disk are valid immediately after installation of all desired applications on a "bare metal" computer, on a newly installed disk, etc. Every one of these pages loaded from the disk into memory would then also be valid. Only when new information has been written to disk or loaded into memory (either system memory, or the local memory of some device) from some external source would there then be a need for code verification before allowing it to be executed.

As yet another example of what could be assumed to be a "safe" state, all pages present after successful execution of a trusted virus-scanning program could be assumed to be safe. Of course, these definitions of what constitutes valid pages are not exclusive, and other definitions may be applied depending on the needs of a particular implementation. For example, all pages present after a fresh installation of software on a "bare metal" computer could be assumed to be safe, as well as all new pages identified as being safe by a trusted external entity.

As yet another example, "safe" or "valid" could be defined as any code blocks for which the computer running them (that is, the user) has a sufficient security clearance or level of permission. Certain programs could be designated by parents (or an external entity) as being unsafe, such that they should not be run by children, who would be identified using normal log-in procedures.

It is therefore necessary to have some way to identify a particular page as being "safe." One way to do this would of course be to store a complete copy of the page. This is both wasteful and unnecessary. In the preferred embodiment of the invention, each page assumed to be valid (using any chosen definition) is assigned at least one value that is computed as a function of the entire or partial contents of that page. One example of such a function may be a hash function, as further explained below. Known invalid pages may be identified using the same procedure.

Any conventional hardware or software structure may be used to mark particular pages as valid or invalid. In general, each page (or other memory unit, including sub- or super-sets of a page, depending on the chosen implementation) is assigned some form of ID, and attributes are associated with each ID. At the simplest level, the attributes indicate simply whether or not the code is allowed to execute. The attribute need not be just binary, however, but rather could indicate different levels of validity or trustworthiness, for example, whether the page is trusted to generate code or not. Various ways of recording and indicating each ID's attribute are discussed below.

FIG. 1 illustrates one way to indicate attributes on systems whose architecture provides hardware support in the form of a set of access control bits 130, with one bit per page. The AMD x86-64 architecture is one example of a hardware platform that provides such access control bits 130. More specifically, the AMD x86-64 architecture defines a "no execute" (NX) in the page-translation tables, which specifies whether instructions can be executed from a given page. The NX bit is not checked during every instruction fetch, but rather when the instruction TLB is loaded with a page translation. Various existing and proposed Intel architectures provide analogous structures.

In systems with hardware-supported page access control, the "permission-to-execute" bits of all pages are set initially to zero (although they could of course be set to one instead—this is a simple matter of convention). Whenever an application attempts to execute code located on a page whose bit is set to zero, the hardware will generate a fault, which the verification engine 250 intercepts or takes using known techniques. The presence of this fault then identifies the current page as one that must be verified.

Figure 2:
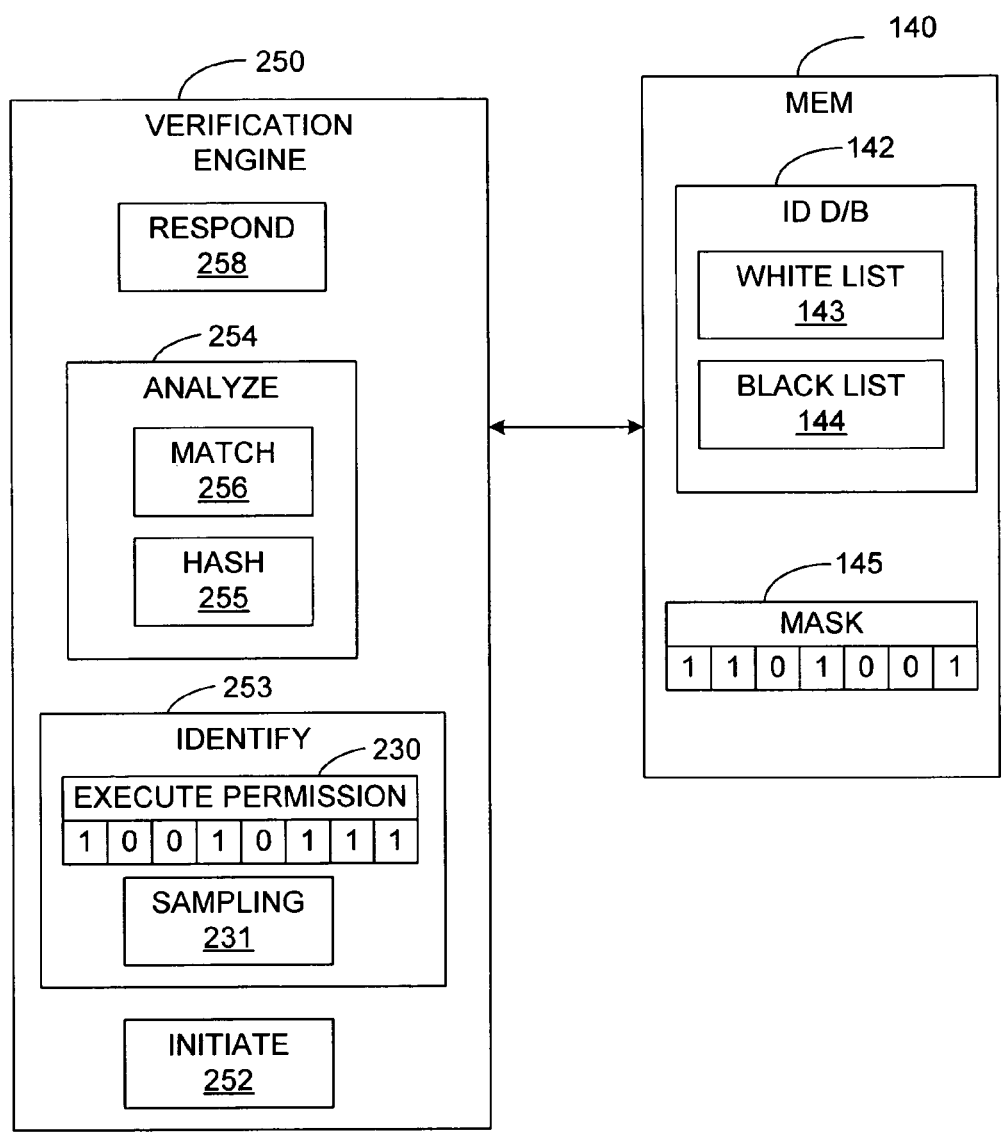
FIG. 2 illustrates certain software modules within a verification engine.

If hardware support is not available, then a data structure analogous to the set of access control bits 130 can be included within the verification engine 250, such as a table 230 of "execute permission" bits shown for the sake of illustration within the identification module 253 in FIG. 2. (The table 230 would of course be a structure in memory but accessible to the verification engine 250.) Instead of sensing a fault, the verification engine 250 then itself inspects the table to determine the state of the bit (or bits) corresponding to the current page.

In virtualized systems in which VM instructions execute in either a direct execution mode or a binary translation mode, the VMM 600 could occasionally deliberately switch execution to binary translation and verify instructions only then. In a system that employs binary translation, verification is preferably performed while copying/translating code into the translation cache, for example by looking up the access/execute permission bits maintained by software as described above. Whereas using the access control bits 130 as described above converts the property of pages from "read-only" or "read-write" to "read-execute-only," periodic switching to binary translation of VM code effectively converts the property of the corresponding pages from "read-only" or "read-write" to "read-only," followed by execution of equivalent (translated) code in translation cache. Note that this same approach may be used in systems that use emulation or interpretation rather than binary translation and would also work in cross-architectural systems, that is, where the instruction set of the guest is not native to the hardware processor(s).

Verifying the current page before execution of each instruction, although possible, adds obvious overhead, in particular in systems that have no hardware support for faulting on attempts to execute instructions from non-executable pages and especially in non-virtualized systems. To reduce the overhead in such systems it would also be possible not to verify every instruction executed, but rather to use one or a combination of sampling techniques such that verification is triggered upon the occurrence of some event. For example, the current page could be verified sequentially, for each n'th instruction, or temporally, after expiration of each time interval of t milli-(or micro) seconds, in which case a counter and timer, respectively, may be incorporated into the verification engine 250, for example, for example, in either the initiation module 252 or the identification module 253, as a sampling code sub-module 231 (shown in module 253 by way of example only).

Depending on the underlying architecture, for example, existing performance counters could also be used to generate an interrupt after every n instructions; such a mechanism is found in most modern processors, including, for example, the Intel Pentium line, the AMD Athlon, etc. The number n or the interval t could also be chosen randomly. Sampling at random times would help defeat timing attacks. Because of the locality property of instructions (most instructions executed will probably be located in a small set of pages given a fixed period), performing the page-verification procedure 100 times a second, for example, will usually detect invalid code with high probability while reducing the overhead of the verification procedure itself.

It would also be possible to sample spatially. For example, all pages (or all pages in some group) be marked initially as valid. Every m'th page in some address range, or a random distribution of pages, could then be marked invalid, thereby triggering verification when they are read from. This procedure could then be repeated at set intervals, for example, every few seconds. Such spatial sampling would help indicate whether the executed working set of pages is generally valid.

Alternatively, the verification engine 250 could exploit any existing non-maskable interrupts (NMIs) or system-management interrupts (SMIs), or existing memory-tracing mechanisms along with standard page table operations to cause the OS to generate software interrupts for pages that have not been verified or are in a "read-only" state (see below). Note, however, that in most embodiments of the invention a page may be marked read-only after verifying it, such that a reverification cost is incurred only if and when the page is subsequently written to.

It would also be possible to include additional hardware, external to the main processor(s), to securely generate interrupts, NMIs, or SMIs in a way that cannot be defeated by the OS. Moreover, in some systems, such as those with SMIs, it may be possible to vector the interrupt to a location in read-only memory (ROM), so that the interrupts, code, and possibly even the ID database 142 (see below) itself would be tamper-proof even from the OS.

In the context of binary translation of instructions issued by a virtual machine (see below for further description in connection with FIG. 3), any instructions fetched from a translation cache could be assumed to be safe, since their corresponding pages will already have been verified before a previous execution.

One other way to identify code that needs verification is by examining its branch history. Some architectures, including modern Intel x86 processors, have varying levels of hardware support for collecting last-branch or branch-history information, which can be used for this purpose. If such hardware support for collecting branching information is not available, or is not adequate, then branch history can be logged using normal techniques and data structures such as a stack. Instead of (or in addition to) verifying the page on which the current instruction is located, the verification engine 250 could also verify the page from which execution has just branched, and the page from which execution branched before that, and so on, to any chosen "depth." Thus, if instruction $instr_0$, located on page $p_0$, causes a branch to instruction $instr_1$, located on page $p_1$, which causes a branch to . . . instruction $instr_k$, located on page $p_k$ then the verification engine 250 could verify all of $p_0$ to $p_k$.

Analysis

Recall that the contents of the instruction pointer % eip, possibly in combination with data in other structures such as segment registers and/or page tables are sufficient to identify on which page the current instruction is located. Assume now that any mechanism described above has identified the page on which the current (but not yet executed) instruction is located as one that has not yet been verified. Assume further that the verification used is a hash function (the discussion below will apply to any other type of function as well).

The contents of the current page (in which the current instruction is located) are then hashed, that is, their hash value is calculated, for example by a hashing routine 255 within the analysis module 256. Examples of hashing routines are given below. This value is then compared, for example by a comparison or matching module 256, against either a "white" list 143, or a "black" list 144, or both, stored in an ID database 142 located either in the local memory 140 of the user's system, or in some other system, such as in a remote server 710 with which the user's system is communicating, or in a combination of storage locations. For example, the white list 143 in the local computer's memory 140 could contain identifiers of all pages previously verified locally by the verification engine 250, whereas a remote white list could contain updates, or a larger set of hash values trusted to correspond to valid code pages. All or part of the local white list could also have been downloaded from a remote, trusted source.

The black list 144 (if included) could similarly be divided into local and remote sub-lists. The black list will typically be provided by a trusted source, although it would be possible for entries to be added locally, for example, if a user discovers that execution of some section of a loaded application is unstable or otherwise undesirable. It would also be possible to maintain user-specific black lists, such that all pages containing the code of one or more applications is identified as invalid for one or more users. For example, using known techniques, parents could prevent some or all of their children from running a checkbook-tracking program or a particularly violent game program. The black list could also incorporate hash values corresponding to pages containing known virus templates.

The way in which the white and black lists are interpreted also determines whether both are needed at all. For example, if an "execute-only-if-white-listed" policy is chosen, then no black list would be necessary. Such a policy would, for example, allow system administrators (or parents, etc.) to prevent execution of all but "approved" programs; thus, employers could ensure that employees are not installing and running unlicensed or otherwise undesirable programs (such as games).

Alternatively, if an "execute-unless-blacklisted" policy is chosen, then no white list would be necessary. Such a policy might be useful to block execution of code known to come from an untrusted or undesirable provider. For example, assume that a user (or system administrator) wishes to keep his system clean of code originating from a particular software publisher. The user could do this by including in the black a list identifiers of known code associated with that publisher.

Of course, by including both the white list 143 and the black list 144 in the ID database 142, more complicated and nuanced policies can be easily implemented. In particular, some pages could be said to be "gray" or "questionable" in the sense that they are found in neither the white list 143 nor the black list 143. The way in which gray pages are treated is a design choice. At the extremes, gray pages could simply be assumed to be either always safe (equivalent to a policy of executing all code unless it is black-listed) or always unsafe (equivalent to a policy of executing only white-listed code). The response to code found to be from a gray page could differ from the responses for white- or black-listed code. For example, the occurrence of "gray" code could trigger a query to an external, possibly more extensive or more recently updated white- and/or black list. As yet another example, gray code could be executed only upon specific user (or administrator) approval after presentation of a suitable displayed prompt; examples of other possible responses are given below.

If the hash value of the current page matches a value in the white list, then the entire page is assumed to contain safe code, at least as long as the page is not written to. The page can then be marked as safe in whatever structure is used for the purpose, such as by setting its corresponding access control bit either in the hardware structure 130 (if provided) or in the structure 230 controlled by the verification engine 250 itself. The marking is preferably interpreted as "read-and-execute-only": As long as no writes occur to the page, then any code fetched from the page is assumed to be safe to execute.

In systems with a hardware-supported access control structure, this means that future execution from the same page will not generate a fault, whereas future writes to the page will. As part of handling a fault, the verification engine 250 or some other module sets that page's "validity bit," for example, in the access control table 130, to the value (such as zero) indicating invalidity. This will cause the verification engine 250 to reverify the page the next time an instruction on that page is to be executed, that is, the next time the page is subject to analysis. In virtualized systems with dual execution modes (see above), this indication of invalidity could also be used to trigger a response such as a switch to execution using binary translation, with verification, retranslation, and caching of the updated page.

In systems that use a software access control structure (for example, because of a lack of a suitable hardware-supported structure or because the hardware-supported structure is needed for other purposes, or simply because of a design choice), such as the table 230, the verification engine 250 can interpret the bits of the table 230 in the same manner, that is, as indicating "read-and-execute-only," with any write to the page causing the page entry to be changed to the value indicating a need for verification upon the next read.

If the hash value of the current page is found in the black list 144, then it is assumed at least temporarily that it is not safe to execute the current instruction. This then triggers a response, several examples of which are given below.

Failure to find a current hash value in the (or any trusted) white list 143 will similarly trigger a response, which need not be the same as the response upon finding code to be black-listed. Assuming one or more external white lists are accessible by the verification engine 250, via conventional network connections (preferably secure, authenticated and encrypted) and software, then the verification engine 250 could first consult the local white list 143. If a current hash value is not found there, it could then query the trusted external source(s). If the hash value is found in the external source, then it could be added to the local white list for future use. If the current hash value is not found externally either, then the verification engine 250 generates a response. If the hash value is found in an external black list, then it could be added to the local black list 144, and a response will be generated. It would also be possible to periodically update the lists 143, 144 in a "batch" operation, for example, by downloading them or just changes to them from the trusted external source(s). Assuming one or more external white and/or black lists is available and accessed, each smaller local white/black list 143, 144 may be viewed as a cache of the corresponding larger external list.

As mentioned above, verification may be done at any level of granularity. Thus, hash values could be computed even for sub-page regions. One example of this would be computation of a page's hash value using only those bytes (or words) known not to contain non-constant data.

The option of examining the branch history of instructions is also mentioned above. Such examination provides an even more stringent test in that code is executed only from white-listed pages, which are invoked from only white-listed call sites, which are in turn invoked only from white-listed call sites, and so on. Instead of a simple page hash, it would then alternatively be possible to verify a tuple in the form {hash, call-site}, where "call-site" could be a list of code addresses (for example, A calls B calls C calls D), or code addresses aggregated at some large granularity (like a page). The call site(s) could also be represented as a list of the hash values of the pages associated with the call addresses.

The analysis provided by the verification engine 250 need not be total. Rather, as explained above, only certain instructions could be verified using a process of either temporal or sequential sampling or both. By adjusting how often (either in terms of time or in terms of percentage of instructions)

instructions are verified, the verification engine 250 could statistically guarantee that "most" code executed by the monitored entity (such as a virtual machine—see below) was from the white list 143, and/or that "almost" no code is executed from the black list 144. At least in systems lacking hardware support for controlling access, and especially where sampling is used, the trade-off is: the greater the certainty, the greater the overhead.

The frequency of verification could be a user- or administrator-adjustable parameter, or could be made automatically adjustable. For example, the verification frequency could be lowered if it can be determined that the entity being monitored is running particularly intensive code, or code known in some other way to involve few cross-page branches. A virtual machine monitor (see below) would have such information available to it for any virtual machine it is supporting, for example. Of course, adjustability is not required by the invention; rather, the verify-before-execute mechanism may be always "on."

In virtualized computer systems that employ dual-mode execution of VM instructions (direct execution vs. binary translation) and lack hardware support such as access control bits, verification of each VM instruction may impose unacceptable overhead, especially on direct execution. As a less costly but less secure alternative, the VMM could deliberately (that is, even absent a triggering fault) interrupt direct execution and switch VM execution to binary translation, for example, at set intervals, at random times, after a set or random number of instructions, etc., to test the validity of currently executing code.

Hash Function

As mentioned above, one example of a verification function for a page is a hash function. As with any other hashing procedure, the hash function module 255 typically yields a single hash value (also known as "fingerprint" or "key") for each input page. This value uniquely identifies the page in the sense that the probability of two different pages (given standard sizes) hashing to the same value is negligible.

It is not necessary to know the address of the reference pages from which the hash table entries are derived because it is a page's contents, not its location on any particular medium, that are used for comparison. Given a 128-bit hash function (for example), the probability of a false match will be much lower than the probability of failure of a physical system component.

Any conventional hash function(s) may be used within the hash module 255. Examples include the well-known SHA-1 ("Secure Hash Algorithm") routine and the MD5 ("Message-Digest Algorithm"). Skilled programmers will readily be able to choose an appropriate hash function to match the requirements of their particular implementation of the invention. The results of a plurality of different hash functions may also be "combined" in a conventional Bloom filter to reduce the storage requirements for the white and/or black lists 143, 144 when implemented as a hash table. At the other end of the spectrum of complexity, the hash function may also be an identity function, that is, the raw contents of pages, or of sub-pages at the same relative locations, could be compared to determine whether they are the same.

Response

Any of several different responses may be appropriate if a current instruction is not found in any white list, or is found to be in a black list. A failure of verification does not necessarily imply that the current instruction is related to malicious code, for example. Examples of these responses (more than one of which may be appropriate) include, but are not limited to:

a warning message posted to the user (and/or a system administrator) indicating that an instruction is scheduled for execution from an unverified page and requesting user input as to how to proceed, such as to shut down the application, proceed with execution, attempt verification from some other specified external source, etc.;

the entity containing the "suspicious" instruction could be ended, preferably also with a warning or notice to the user;

the entity could be suspended for some time so as to give the user or administrator a chance, for example, to take appropriate remedial action;

the entity could be terminated and/or reinitialized;

a conventional invalid opcode fault could be generated and handled in any known manner either by the OS 220, by a handler within a virtual machine monitor in a virtualized system (see below), or by some other component;

if the entity's current activity involves a network connection, then the connection could be broken;

a message (such as e-mail) may be generated and sent automatically to a predetermined recipient to give notification of an attempt to execute invalid (or unauthorized) instructions;

in virtualized systems, such as those provided by VMware, Inc., "snapshots" or "checkpoints" of the state of a VM can be taken such that continued execution can be "rolled back" to the (or any previous) checkpointed state. One optional response to attempted execution of non-verifiable VM code (for example, neither white-listed nor black-listed) would be to checkpoint the VM before execution the "suspicious" instruction, then to continue execution. Upon observing any undesired effect of the continued execution, the VM could then be restored to the checkpointed state.

The response might also optionally be delayed. For example, rather than generating a response every time code is sensed as coming from a page not found in the white list, the verification engine 250 could maintain statistics on, for example, the percentage of instructions in a time period, or the number of instructions in a row, etc., that have come from non-white-listed pages. Response could then be delayed until a threshold percentage or number is exceeded.

Furthermore, depending on the needs of a particular implementation of the invention, or simply on design choice, it would be possible to associate different responses with different page IDs (per-page hashes) or page groups. For example, some IDs in the blacklist could trigger generation of a warning, whereas others might cause termination of a running VM.

Location of Verification Engine

The relevance of the discussion above relating to virtual computers is: The VMM 600, and therefore components included in the VMM such as the verification engine 250, will be able to observe not only the actual VM instruction stream, but also the page numbers in both virtual and physical memory space for the page on which each instruction is located. Even in hosted virtualized computers, the VMM is therefore able to request physical memory pages from the host OS 220 in response to guest OS requests. Since the VMM also controls execution of VM instructions, it may also "hold up" submission of an instruction for actual execution on the hardware platform 100 until the page on which the instruction is located has been verified by the verification engine 250; in the context of VMs, "holding up" is often referred to as "blocking" or "descheduling" the VM, or placing it in a wait state.

As FIG. 4 illustrates, the verification engine 250 may alternatively (or additionally) be included as a module within the kernel 800. Because the kernel serves as the interface for all VM/VMMs, as well as for the OS 220 and applications 300 running on it (depending on how the kernel is configured relative to the OS 220 after loading), the verification engine 250 within the kernel 800 will be able to perform the "verify-before-execute" function described above for all these entities, or for any selected subset of them.

In non-hosted configurations, one advantage of installing the verification engine 250 in the kernel 800 is that this would provide a secure platform for any VMs loaded on the kernel, even where other non-VM guests are also loaded. Virtual machines could thus be migrated to other platforms that have the verification engine 250 and their users could then be assured not only that they would be able to use their migrated VM, including installing new applications, with the security of the verify-before-execute mechanism provided by this invention.

Instances of the verification engine 250 could be included in any combination of the kernel 800 (in a non-hosted environment), the VMMs 600 (all or fewer), or the OS 220 (if modifications to the OS 220 are allowed), to verify the code of any entity(ies) running on them, respectively. If the verification engine 250 is part of a software component that does not directly control memory allocation, then some mechanism must be included to allow the verification engine 250 to access the ID data base 142, either locally or via the network, unless this data base is made part of the verification engine 250 itself. Skilled programmers will know how to implement various options to make this possible.

It would also be possible to include an instance of the verification engine 250 in the VM itself, for example as a modification to the guest OS 520. Assuming that a fixed white (and/or) black list is provided along with such a "self-attesting" VM, it would then also be possible to ensure that a newly loaded VM would execute only certain code and/or not execute certain other code, even if no mechanism is included in the host platform to prevent this.

As yet another alternative, in a system that lacks a per-page execute/access control bit, but has a software-loaded TLB (or one of a plurality of TLBs that indicates faults based on instruction accesses), it would be possible to locate the verification engine in the portion of the memory management software known as the "TLB miss handler" (which handles references to pages that are not yet included in the TLB itself) so that it would verify a page when the first reference to it is loaded into the TLB.

Hybrid Verification

In many "closed" systems, such as kiosks, bank ATMs, etc., it is desirable to completely avoid pages that contain both instructions and data and it is easy to arrange these systems to meet this need. Not all code pages, whether for system-level software or user-level applications (including virtual machines) can be assumed to contain only instructions, however, but rather may also include data that may change. This is particularly true when it comes to systems that use existing commodity systems such as Windows. Moreover, some programs have dynamic runtime code, such that a page containing only code may not remain unchanged during program execution. In such cases, it could happen that perfectly safe code is not executed, whereas ignoring the change (inequality in hash values) could cause code to be executed that should not be. Hybrid verification may then be used to handle such situations if they are found to occur too often. Examples of these situations include:

Pages that contain both code and data. There are different ways to deal with this situation. One way, which is described in greater detail below, involves hashing masked versions of pages. Other techniques for handling mixed instruction/data pages include alternative encoding to specify a subset of the page contents to hash.

Dynamically generated code. In systems that allow code to be generated dynamically, it is particularly improbable that any given page containing such code will have been known in the past such that its hash value would be in a white list. In such case, one alternative would be to verify that the dynamically generated code is written only from a select subset of white-listed pages (or pages in which the "trusted to generate code" attribute is otherwise indicated), for example, from only a handful of white-listed pages that are trusted to generate safe code. Trusted "parent" code would therefore be assumed to generate trusted "offspring" code. If needed, the hash values of all trusted generated code could then be computed and added to the white list.

Code that is copied to a random starting virtual address before execution. This might occur in malicious blacklisted code; some white-listed code could also use this technique to protect itself from attack. One way to handle such cases is to compute the hash values based on traces of executed instructions, regardless of virtual address offsets. For example, a hash table of "entry basic blocks" could be used to build up the white and black lists 143, 144. Upon detecting any such code pattern, the verification engine 250 could initiate a detailed execution trace to determine whether the code is safe by tracing it back to either a white-listed or black-listed value.

Dynamic link libraries (DLLs), found in Microsoft Windows; dynamic libraries for user level programs and dynamically loaded modules for the kernel, found in Linux; etc. Again, an optional mask could be used (see below) on code pages that are linked to DLLs (or equivalent structures). These pages may also be identified using known methods such as the alternative encoding mentioned above.

Partial Hashing Using Masking

In order to generate a white list, or, indeed, a black list, it is necessary to know the page contents (in whole or in part) in advance, or to know in some other way that the page is valid or not—page identifiers (such as hash values) cannot be computed for completely unknown pages. In other words, pages that can be verified dynamically are those that have been identified in some way beforehand.

Given a page of memory, it will therefore be known in advance which bytes (or other page sub-units) contain instructions and which contain data. Given proper analysis, known techniques may also be used to determine which of the data is constant (for example, immediate operands) and which may change during normal execution of the instructions. For each such page, it is therefore possible to identify which bytes, etc., can be assumed to represent non-changing values and which represent potentially changing values. Since this is a binary decision, the simplest way to indicate this for each byte is to establish a bitmap with one bit per byte; for example, a value of "1" could indicate that the respective byte represents something that is invariant and a "0" could represent a byte whose value might change during normal execution of the program whose code is subject to dynamic verification using this invention. Note that the same method may be used to identify even invariant memory units—even those including instructions—that for some other reason are not "interesting" or not relevant for the purpose of verification.

In FIG. 2, a bitmap 145 is shown as being stored within memory. The bitmap 145 may be included along with the installation disc(s) (or download) of the application(s) or other code to be verified, or the bitmap could be loaded separately.

The bitmap 145 integrates efficiently with hashing: A typical hash function calculates some function (often, but not necessarily, polynomial) of the values in each of several entries such as eight- or sixteen-byte words. If the bitmask value for a particular byte of a page is "0", then its contents may either be skipped during calculation of the hash value or assumed to be equal to some default value such as zero. As such, only a subset of the contents of each page will be used in the hash function used to identify the page, hence the name "partial hashing." No matter how the masked-out values of such a page changes, they will then not affect the hash value of the page as a whole.

This masking technique can be used to clear all constant values (for example, numeric offsets and immediates) encoded in instructions. These constants are usually dynamically patched by a linker at runtime to indicate target data or code's virtual addresses. The generated hash value could then be matched to the white list. Note that it would be very hard for someone to launch an attack by just replacing these constants without running extra code, so such code hashing will in almost all cases be a sufficient security policy.

The optional partial hashing feature of the invention can be described more formally as follows:

First, let the information kept in the white list 143 for each code page be referred to as "CodeID." (The technique described here may also, or instead, be applied to the black list. The discussion refers only to the white list merely by way of example.) A CodeID defines all necessary information to verify whether a page is similar enough to a known page so that it may be considered safe.

Hash verification of all the contents of a page may be termed "full hashing." In full hashing, the hash value computed from the entire contents of a page (hashVal(p)) is compared against the hash value for a known page. The CodeID for a full hashing of a page p (CodeID_full(p)) is thus composed of the hash value on the page itself, that is:

$$\text{CodeID\_full}(p) = \{\text{hashVal}(p)\}$$

As mentioned above, partial hashing involves comparing the hash value of a subset of the contents of a page with the hash value computed from the same subset of the contents of the original "reference" page. The subset is determined using a data structure mask to determine whether a byte (or bit, or other grouping of bits) on the page is a part of the selected subset. One implementation of the mask is the bitmap 145 mentioned above, although other known masking techniques may be used as well. The main steps for the procedure for partial hashing, regardless of what structure is used to implement it, are:

Let $p_{curr}$ be a current page that is to be analyzed for validity. Clear (or simply ignore) all irrelevant contents on page $p_{curr}$ and obtain a new page p*, i.e. p*=Clear($p_{curr}$, mask($p_{curr}$)), where function "Clear" takes page $p_{curr}$ and masks it using the mask function mask(.) and returns a new page p*. Although the contents of $p_{curr}$ could be transformed in some way to form p*, in general it will suffice simply to select p*, using the mask, as a sub-set of the contents of $p_{curr}$. The remaining bytes are either cleared (or set to another default value) or ignored. For most common hash functions, clearing bytes will produce a different hash value than ignoring bytes will. Either method may be used as long as it is used consistently. Note that full hashing may be considered a special case of "partial" hashing in that it means that none of the contents of p are excluded from hashing.

Calculate the hash value hashVal(p*) for p* and compare it with the hash value obtained from a known reference page $p_{ref}$ using the same mask. If they are the same, then D curr may be considered "safe" or valid.

CodeID for a partial page p* can therefore be defined:

$$\text{CodeID}(p^*) = \text{CodeID\_part}(p) = \{\text{hashVal}(\text{Clear}(p, \text{mask}(p))), \text{mask}(p)\}$$

In this example, the CodeID, or CodeID_part of the page p therefore has two elements: 1) information, represented using any known data structure, that defines the mask used; and 2) the hash value obtained for the sub-set (which need not be a proper sub-set) of the page p remaining after applying the specified mask.

With full hashing, the system may calculate hashVal($p_{curr}$) based on the entire contents of a page $p_{curr}$, and then look up hashVal($p_{curr}$) in a database such as the ID database 142 or just the white list 143. The time to complete the analysis will then also be constant. With partial hashing, however, it is necessary to match the hash value of the partial current page p* against all possible CodeID_parts in the database, or at least against all until a match is found (if at all). The complexity involved in looking for a match is thus O(n), where n is the total number of different CodeID_parts in the database (for example, in the white list 143).

The two techniques may be combined to form a "hybrid hashing" technique, which uses both the full hash values CodeID_full(p) and the hash values CodeID_part(p) for the partial, masked pages:

To analyze a current page $p_{curr}$ to D t be verified, first apply full hashing to the page and try to find a CodeID_full($p_{ref}$) in the database such that $$\text{hashVal}(p_{curr}) == \text{hashVal}(p_{ref}).$$

For pages with only constant contents, this will find a match if the page is "safe." If a match is not found, then, until a match is found (if at all) apply each available mask and enumerate all possible CodeID_part values in the database until a CodeID_part($p_{curr}$) match is found, that is, with a given mask, examine the database to find:

$$\text{hashVal}(\text{Clear}(p_{curr}, \text{mask}(p_{curr}))) == \text{hashVal}(\text{Clear}(p_{ref}, \text{mask}(p_{curr}))).$$

If no match has been found, then the page can be assumed to be unsafe or at least unverifiable.

Because the complexity of partial hashing is linear, the more CodeID_parts that exist in the database 142, the longer it will take to finish the analysis. Performance can be improved by applying various optimizations, however: The core idea is that some sub-set of a page (or other memory unit) is selected and examined to determine whether the page contents have changed from some predetermined "safe" values. For example, if the bit-wise AND of all masks in the system is non-zero, then the system could hash with this common mask to narrow down the set of pages/masks to compare against.

As another example, assume that one of the triggering events for analyzing a page is the start of execution of the first instructions on the page. Now define entry points of a code page as all possible offsets within the page that the % eip can reach by executing a previous instruction on another page—intuitively, entry points are places where % eip jumps from another page to the current page.

Now further define an entry block as an instruction sequence of any known size, such as a basic block, following the entry point. The set of entry points and blocks of a page p may therefore be defined thus:

$$\text{Entry}(p)=\{(d0,b0),(d1,b1),(d2,b2),\ldots\}$$

where d0, d1, d2 ... are entry points and b0, b1, b2 ... are entry blocks.

For entry block b, a mask mask(b) may be defined as before that identifies constants in the entry block. The system may then calculate the hash value for each entry point and entry block using the same or similar hashing algorithm as used elsewhere in the calculations.

Now define the hash value for a block (d0, b0) as:

$$\text{Index}(d0,b0)=\text{hashVal}(\text{Clear}(b0,\text{mask}(b0))+d0),$$

where operator "+" is defined as byte contents concatenation. Thus for each CodeID_part(p), the set of all indices may be defined as:

$$\text{IndexSet}(p)=\{\text{Index}(d0,b0),\text{Index}(d1,b1),\ldots\}$$

The mappings between indices and CodeIDs are many-to-many, i.e., an index may be contained in IndexSet of multiple pages. The set of all possible CodeIDs for an index i is defined as following:

$$\text{IndexCodeIDSet}(i)=\{p \text{ such that } i \text{ is contained in IndexSet}(p)\}.$$

By keeping all IndexCodeIDSets in the database 142, then to analyze a page p with % eip pointing to an entry point, the following steps should complete the analysis:

Obtain the entry point d from % eip and the entry block b by decoding a basic block on the page. Thus, obtain i=Index(d, b).

Look up IndexCodeIDSet(i) in the database 142. For each $p_{curr}$ in IndexCodeIDSet(i), try to match CodeID_part($p_{curr}$) with p until a match found.

If no match is found, then label the page is not "safe.", curr

If mask(b) is not a subset of mask(p0), then the page is not "safe." In other words, if there is a matching page p0 and mask(b) is a subset of mask(p0), then the page is "safe;" otherwise it is not "safe."

Notice that the number of pages in IndexCodeIDSet(i) should preferably be very small since the probability that two different pages will contain the same entry block at the same page offset will normally be very small.

Using known methods, it is not easy to identify all entry points into a code page even with the source code of the guest available. As one optional feature, an IndexCodeIDSet database and a CodeID_part database for partial hashing can be generated automatically through training by repeatedly running the "good" guest. The main steps of this procedure are:

When the verification engine is initialized, load CodeID_part and IndexCodeIDSet databases from non-volatile storage. Then create another runtime database called PNumCodeID that maps {GVPN, GPPN} (which uniquely defines a hardware PPN) to p, where CodeID_part(p) is the last known CodeID that matches the page, i.e., PNumCodeID ({GVPN, GPPN})=p, such that CodeID_part(p) matches the page.

During analysis of the current page $p_{curr}$, obtain offset d from % eip and the basic block b by decoding the page. Also obtain GVPN and GPPN of the page from the system using other known mechanisms.

Look up PNumCodeID({GVPN, GPPN}) in the database. If p=PNumCodeID({GVPN, GPPN}) exists, then try to match the current page with CodeID_part(p). If it matches, go to step 7.

If PNumCodeID({GVPN, GPPN}) does not exist or does not match, then the current offset d must be an entry point. We look up IndexCodeIDSet(Index(d, b)). For each page pi in IndexCodeIDSet(Index(d, b)), if CodeID_part(pi) matches p, go to step 7.

Enumerate all CodeID_parts in the database and try to find a matching CodeID_part(p_i) with p. If a match is found, then add p to IndexCodeIDSet(Index(d, b)) and go to step 7.

Since no existing pages can be found, add a new CodeID_part(p) to the database. Add p to IndexCodeIDSet (Index(d, b)) in the database.

Assign p to PNumCodeID({GVPN, GPPN}). Merge mask (b) to mask(p) in CodeID_part(p) and recalculate hashVal (Clear(p, mask(p))) in CodeID_part(p).

Notice that, in step 2, it was not necessary to force % eip to target an entry point. It is therefore possible to analyze all code in current page as long as an event triggers it. One requirement is that the system should at least analyze the page when the code in the page is first executed.

The runtime database PNumCodeID({GVPN, GPPN}) can also be used for code verification. In this case, the system may analyze a page upon occurrence of various events as long as one of the events for analysis is when the page's code is first executed; entry point and entry block lookup is needed only when the code on the page is first executed. The CodeID_part indicated by PNumCodeID({GVPN, GPPN} will match the same page on subsequent analysis as long as the page content in the memory is not changed.

Super-Page and VM-Level Verification

As mentioned above, verification may be done at any level of granularity, including for sub-page regions. In fact, code verification may also be performed at super-page or multi-page granularity as well, or on page or sub-page portions of a specific super-page data set. As one example, in some virtualized systems, one or more VMs are "read only" and carry one or more applications that need to communicate with a remote server. The remote server in turn may require that the application(s) and the guest OS 520 running on the VM are authentic and unmodified relative to some assumed state. Using dynamic code verification as described above, this can be achieved by sending to the server at connection time a security footprint calculated from the VM image, the VMM code and configuration and metadata, as well as the white list and/or the black list. Any failure to verify the running VM code would then be detected, so that the remote server would be warned of any verification violation and could take any desired measures.

License Enforcement

There are of course a large number of uses for the "verify-before-execute" mechanism provided by the invention. Protection against viruses, bugs, unknown code, etc., has already been mentioned. The mechanism could also be used even where code is known—even known to be safe—should not be executed for some other reason. One example is for the enforcement of the provisions of licensing agreements by preventing execution of programs for which no licenses have been paid; upon paying the license or buying a valid copy of the program, the corresponding page hash codes could be added to the white list or eliminated from the black list as part of the installation or update process, depending on how the mechanism is implemented. A black list could be included along with a copy of an operating system supplied with a new computer, for example, so as to prevent execution of pirated copies of known (and hashed) software.

The "verify-before-execute" mechanism provided by the invention could also be modified to provide billing or usage information: Assume that all execute permission bits in the table 230 or the hardware structure 130 are initialized to zero. Each time a page of code is accessed and verified, its execute permission bit will be set to one and it would normally stay that way unless the page is written to. It would be possible, however, to periodically clear the execute permission bits for all or a statistically selected subset of pages. Each new access will then cause reverification, which can be logged in any known manner, for example, in an array of page access or page hash counts. The values in the array would then indicate how often (absolutely, or as a statistical estimate, depending on how often bits are deliberately cleared) each code page is accessed. This information could then be used for any purpose, such as for feature-based billing or for product development (since it would give developers an idea of "popular" features).

Execution/Content Tracking

Yet another novel use of the verify-before-execute feature provided by the invention would to automatically identify and track code that has actually been executed. For example, assume that the ID database 142 contains hash values for pages of a set (possibly large, thanks to the compression that hashing enables) of known programs. Recall that the ID database 142 may be located in whole or in part in a remote server so that the local memory's size need not be a significant limitation on this use of the invention.

If now the verification engine 250 were to analyze the page on which a current (or logged) instruction is located, it could determine which, if any, of the set of known programs it is part of. For example, if the hash value of the current page is the same as a stored hash value for program X, then it can be assumed (to within the certainty provided by the hashing function, which is typically exceptionally high) that program X is being executed. This fact could then be logged for use by a system administrator, or reported onward, for example, via the network, to some remote entity.

Because hash values identify the contents of a software entity at a higher level (for example, at the level of programs, operating systems, or even resident databases) based on the contents of individual pages, the hash values can also be used to generate compact metadata about what the software entity contains. Where the software entity is a virtual machine, this would in turn enable an efficient way to automatically identify and classify each VM by its contents.

We claim:

1. A method for protecting a computer from unauthorized code, the computer including at least one processor that executes instructions stored in a memory that is organized into separately addressable pages of memory, the method comprising:
   executing a program, the program having a series of computer-executable instructions executed by the at least one processor, the at least one processor residing in a system hardware platform;
   verifying that the program is valid using a verification engine including verification instructions for execution on the at least one processor residing in the system hardware platform, the program being valid when the program does not include the unauthorized code, wherein the verification engine resides in a system software layer, the system software layer performing hardware-interface and resource-allocating functions;
   ensuring that the program is not executed without also dynamically performing the verifying; and
   continuing execution of the program after dynamically performing the verifying by executing the next instruction as long as the verifying determines that the program is valid and generating a protective response when the verifying does not determine that the program is valid;
   wherein the verifying that the program is valid comprises executing the verification instructions of the verification engine, the verification instructions causing the at least one processor to perform a method comprising:
      identifying the next instruction to be executed in the program;
      for the next instruction to be executed in the program, determining an identifying value for a page of memory that contains the next instruction;
      determining whether the identifying value satisfies a validation condition, wherein the determining as to whether the identifying value satisfies the validation condition comprises comparing the identifying value of the page of memory with a set of reference values; and
      determining that the program is valid only when the validation condition is satisfied.

2. The method of claim 1, wherein the validation condition is that the identifying value of the page of memory matches any reference value in the set of reference values.

3. The method of claim 1, wherein the validation condition is that the identifying value of the page of memory differs from each reference value in the set of reference values.

4. The method of claim 1, wherein the verifying that the program is valid further comprises:
   for each of the separately addressable pages of memory, indicating in a structure whether the page is valid;
   accessing the structure to determine whether the page of memory is valid prior to the determining of the identifying value; and
   performing the determining of the identifying value when the structure does not indicate that the page of memory is valid and directly allowing execution of the next instruction when the structure indicates that the page of memory is valid.

5. The method of claim 4, wherein the structure comprises a group of hardware attribute indicators, and wherein the indicating in the structure whether the plurality of pages of memory are validated comprises setting one of the hardware attribute indicators, the one hardware attribute indicator corresponding to the page of memory.

6. The method of claim 5, in which the hardware attribute indicators are execute and write permission attributes associated with an entry in a translation lookaside buffer.

7. The method of claim 4, wherein the structure comprises a software data structure, and wherein the indicating in the structure whether the plurality of pages of memory are validated comprises making a corresponding entry in the software data structure.

8. The method of claim 4, wherein the determining of the identifying value for the page of memory and the determining of whether the identifying value satisfies the validation condition are performed only when the structure does not indicate that the page of memory is valid, the method further comprising:
   when the structure does not indicate that the page of memory is valid, modifying the structure to indicate that the page of memory is valid when the identifying value satisfies the validation condition.

9. The method of claim 8, further comprising:
   sensing modification of one of the pages of memory that the structure indicates is valid and, in response to the modification, setting its indication in the structure to indicate that the page of memory is not valid.

10. The method of claim 4, wherein the verifying that the program is valid further comprises:
    determining a branch history for the next instruction; and checking whether the pages of memory in which instructions in the branch history are located are valid, the validation condition including the requirement that each checked in the branch history is valid.

11. The method of claim 1, wherein the determining of the identifying value and the determining as to whether the validation condition has been satisfied are performed only after a triggering event occurs.

12. The method of claim 11, wherein the triggering event is writing of at least one new unit of code or data to any physical component within the computer.

13. The method of claim 11, in which the triggering event is an attempted execution of any instruction located on any unverified page of memory.

14. The method of claim 11, wherein the triggering event is an attempted execution of any instruction located on any unverified page of memory of newly installed software.

15. The method of claim 11, further comprising triggering the verification of the computer instructions depending on an identity of a user of the computer, the user having caused the next instruction to be identified for execution.

16. The method of claim 11, further comprising triggering dynamic verification depending on a context in which the next instruction is submitted for execution, wherein the context is a level of security clearance associated with the computer, a user of the computer, or a program of which the next instruction is a part.

17. The method of claim 1, wherein the identifying of the next instruction is performed for only a sample of the series of instructions.

18. The method of claim 17, wherein the sample is a time-sampled subset of the series of instructions.

19. The method of claim 17, wherein the sample is a sequentially sampled subset of the series of instructions.

20. The method of claim 17, wherein the sample is a subset of the series of instructions sampled spatially, the sampling being over a range of page of memory identifiers.

21. The method of claim 1, wherein the protective response comprises termination of a software entity with which the current page of memory is associated.

22. The method of claim 1, wherein the protective response comprises suspension of execution of a software entity with which the current page of memory is associated.

23. The method of claim 1, wherein the protective response comprises a message posted to a user, system administrator, or other predetermined recipient.

24. The method of claim 1, wherein:
the computer includes a virtual machine running in a direct execution mode on an underlying hardware platform via an intermediate software layer; and
the protective response comprises a switching of an execution mode of the virtual machine from the direct execution mode to a binary translation mode.

25. The method of claim 1, wherein:
the computer includes a virtual machine running on the underlying hardware platform via an intermediate software layer; and
the protective response includes checkpointing the state of the virtual machine.

26. The method of claim 1, wherein the protective response is a first possible response, the method further comprising:
associating the first possible response with the page of memory;
associating a second possible response with a different page of memory; and
upon detection of failure of the next instruction to satisfy the validation condition, identifying which one of the possible responses is associated with the page of memory, and generating the one possible response associated with the page of memory in which the next instruction is located.

27. The method of claim 1, further comprising:
associating reference values from the set of reference values with respective programs such that each association signifies that the reference value corresponds to a page of memory storing instructions for one of the programs; and
tracking which of the respective programs is being executed and the association between the matching reference value and the corresponding one of the programs.

28. The method of claim 1, wherein:
the computer includes a virtual machine (VM) running on the underlying hardware platform via the system software layer operable to switch the virtual machine between a direct execution mode and a binary translation mode; and
the series of instructions comprise VM-is sued instructions issued in conjunction with binary translation of any of the VM-issued instructions, the VM-issued instructions thereby being verified.

29. The method of claim 1, wherein the identifying value is a hash value that is computed as a function of all contents of the page of memory.

30. The method of claim 1, wherein the identifying value is a hash value that is computed as a function of contents of the page of memory such that some of the contents of the page of memory are ignored when computing the hash value, the ignored portion being defined by a subset selection structure.

31. The method of claim 1, wherein ensuring that the program is not executed without dynamically performing the verifying comprises interrupting execution of the series of computer-executable instructions of the program while dynamically performing the verifying to execute the verification instructions of the verification engine using the at least one processor to perform.

32. The method of claim 1, wherein:
the series of computer-executable instructions belong to an instruction set associated with the at least one processor, and
the verification instructions belong to the instruction set associated with the at least one processor.

33. The method of claim 1, wherein the dynamically performing of the verifying is initiated from the system software layer.

34. A method for protecting a computer from unauthorized code, the computer including at least one processor that executes instructions stored in memory that is organized into separately addressable pages of memory, the method comprising:
executing a program, the program having a series of computer-executable instructions;
verifying that the program is valid as the program executes, the program being valid when the program does not include the unauthorized code, the verifying based on a current instruction to be executed when executing the series of instructions in the program;
generating a protective response when the verifying determines that the program is not valid; and
executing the current instruction when the verifying determines that the program is valid;
wherein the verifying that the program is valid comprises:
identifying the current instruction to be executed when executing the series of instructions, the current instruction being one of the series of instructions being executed identified for submission to the processor for execution and not yet executed at a time of the identifying;

for at least the current instruction, computing a hash value as a function of a subset of contents of a current page of memory that contains the current instruction;

determining, during the executing of the series of instructions, whether the hash value satisfies a validation condition by comparing the hash value of the current page of memory with a set of reference values; and determining that the program is valid when the hash value satisfies the validation condition, and determining that the program is not valid when the hash value does not satisfy the validation condition;

wherein the computing of the hash value comprises applying a mask to the current page of memory, the mask being a data structure that designates at least one byte of the current page of memory to be ignored in the computing of the hash value, the data structure designating less than an entire page of memory so that the hash value is based on only part of the contents of the current page of memory.

35. The method of claim 34, further comprising:

identifying, an indeterminate portion of the current page of memory, the indeterminate portion being non-indicative of validity of the current page of memory as a whole; and configuring the mask so that the mask designates at least the indeterminate portion to be ignored when generating the hash value.

36. A non-transitory machine readable storage medium embodying executable code for protecting a computer from unauthorized code, the computer including at least one processor that executes instructions stored in a memory that is organized into separately addressable pages of memory, the executable code being a verification engine causing the computer to perform a method having operations of:

executing a program, the program having a series of computer-executable instructions executed by the at least one processor, the at least one processor residing in a system hardware platform;

verifying that the program is valid using a verification engine including verification instructions for execution on the at least on processor residing in the system hardware platform, the program being valid when the program does not include the unauthorized code, wherein the verification engine resides in a system software layer, the system software layer performing hardware-interface and resource-allocating functions;

ensuring that the program is not executed without also dynamically performing the verifying, the verifying based on a next instruction to be executed in the series of computer-executable instructions in the program; and continuing execution of the program as long as the verifying determines that the program is valid and generating a protective response when the verifying does not determine that the program is valid;

wherein the verifying that the program is valid comprises executing the verification instructions of the verification engine, the verification instructions causing the at least one processor to perform a method comprising:

identifying the next instruction of the series of computer-executable instructions to be executed when executing the program;

for the next instruction, and during the execution of the program, determining an identifying value for a page of memory that contains the next instruction;

determining whether the identifying value satisfies a validation condition, wherein the determining as to whether the identifying value satisfies the validation condition comprises comparing the identifying value of the page of memory with a set of reference values; and determining that the program is valid only when the validation condition is satisfied.

37. The machine readable storage medium of claim 36, wherein the validation condition is that the identifying value of the page of memory matches any reference value in the set of reference values.

38. The machine readable storage medium of claim 36, wherein the validation condition is that the identifying value of the page of memory differs from each reference value in the set of reference values.

39. The machine readable storage medium of claim 36, wherein: the identifying value is a hash value that is computed as a function of contents of the page of memory.

40. The machine readable storage medium of claim 39, wherein some of the contents of the page of memory are ignored when computing the hash value, the ignored portion being defined by a subset selection structure.

41. The machine readable storage medium of claim 40, wherein the subset selection structure is a mask.

42. The machine readable storage medium of claim 36, wherein the verifying that the program is valid further comprises:

for each of the separately addressable pages of memory, indicating in a structure whether the is valid;

accessing the structure to determine whether the page of memory is valid prior to the determining of the identifying value; and performing the determining of the identifying value when the structure does not indicate that the page of memory is valid and directly allowing execution of the next instruction when the structure indicates that the page of memory is valid.

43. The machine readable storage medium of claim 42, wherein the structure comprises a group of hardware attribute indicators, and wherein the indicating in the structure whether the plurality of pages of memory is valid comprises setting one of the hardware attribute indicators corresponding to the page of memory.

44. The machine readable storage medium of claim 43, in which the hardware attribute indicators are execute and write permission attributes associated with an entry in a translation lookaside buffer.

45. The machine readable storage medium of claim 42, wherein the structure comprises a software data structure, and wherein the verifying further comprises selecting for verification only a sample of the next instructions.

46. The machine readable storage medium of claim 36, wherein:

the verification engine resides in an intermediate virtualization layer in the system software layer between a virtual machine and the hardware platform of the computer;

the next instruction is issued by the virtual machine; and the verifying that the program is valid is performed while copying or translating in conjunction with binary translation of instructions for the virtual machine.

47. The machine readable storage medium of claim 46, wherein the protective response comprises switching the intermediate virtualization layer to a binary translation mode.

48. A method for verifying the validity of instructions in a computer that includes at least one physical processor that executes instructions stored in a memory of the computer, the memory being organized into separately addressable pages of memory, the computer also including system software and verification software residing in a system software layer, the verification software including verification instructions for execution on the at least one physical processor residing in a system hardware platform, the method comprising:

monitoring instructions to be executed by the at least one physical processor under control of the system software layer, the system software layer performing hardware-interface and resource-allocating functions;

as long as the instructions to be executed under control of the system software are stored in one or more pages of memory for which validation is deemed unnecessary, allowing the instructions to be executed under control of the system software on the at least one physical processor; and detecting that an unvalidated instruction is to be executed under control of the system software, the unvalidated instruction being stored in a page of memory that has not been validated, and, before allowing the unvalidated instruction to execute, attempting to validate the unvalidated by executing the verification instructions of the verification software in the system software layer, the verification instructions causing the at least one physical processor to perform a method comprising:

determining an identifying value for the unvalidated page of memory;

comparing the identifying value of the unvalidated page of memory with a set of reference values;

if the identifying value satisfies a validation condition, allowing execution after satisfying the validation condition, under control of the system software layer, of instructions stored in the unvalidated page of memory; and if the identifying value does not satisfy the validation condition, generating a response.

49. The method of claim 48, wherein the validation condition is that the identifying value of the page of memory matches any reference value in the set of reference values.

50. The method of claim 48, wherein the validation condition is that the identifying value of the page of memory differs from each reference value in the set of reference values.

51. The method of claim 48, wherein the determining of the identifying value comprises computing a hash value as a function of contents of the unvalidated page of memory, the identifying value being the hash value.

52. The method of claim 51, wherein some of the contents of the unvalidated page of memory are ignored when computing the hash value, the ignored portion being defined by a subset selection structure.

53. The method of claim 52, wherein the subset selection structure is a mask.

54. The method of claim 48, wherein the detecting that an unvalidated instruction is to be executed comprises:

for each of the separately addressable pages of memory, indicating in a structure whether the page of memory is valid;

accessing the structure to determine whether one of the pages of memory containing the instructions to be executed is valid prior to the determining of the identifying value; and detecting that the instruction to be executed is unvalidated when the structure does not indicate that the page of memory that contains the instruction to be executed is valid.

55. The method of claim 54, wherein the structure comprises a group of hardware attribute indicators, and wherein the indicating in the structure whether the page of memory is valid comprises setting one of the hardware attribute indicators corresponding to the page of memory.

56. The method of claim 54, wherein the structure comprises a software data structure.

57. The method of claim 48, wherein:

the verification software resides in an intermediate virtualization layer of the system software layer between a virtual machine and a hardware platform of the computer;

the instructions to be executed that are being monitored comprise instructions issued by the virtual machine; and the verifying of the validity of the instructions is carried out while copying or translating in conjunction with binary translation of the instructions to be executed.

58. The method of claim 48, wherein the detecting that an unvalidated instruction is to be executed further comprises:

determining a branch history for the unvalidated instruction; and checking whether pages of memory in which instructions in the branch history are located are valid, the validation condition including the requirement that each checked page of memory in the branch history is valid.

59. The method of claim 48, wherein monitoring of the instructions to be executed and the detecting that the unvalidated instruction is to be executed are performed only after a triggering event occurs.

60. A method for protecting a computer from unauthorized code, the computer including at least one processor that executes instructions stored in a memory, the memory being organized into separately addressable pages of memory, the method comprising:

setting execute permission indicators for the separately addressable pages of memory in a structure, wherein an execute permission indicator for a page of memory indicates whether the page of memory is valid;

executing a program, the program having a series of computer-executable instructions being executed by the at least one processor;

determining when the program attempts to execute an instruction on a page of memory in which an indicator for the page of memory does not indicate that the page of memory is valid;

dynamically verifying that the page of memory is valid, the page of memory being valid when the page of memory does not include unauthorized code; and continuing execution of the program after dynamically performing the verifying by executing the instruction as long as the verifying determines that the page of memory is valid and generating a protective response when the verifying determines that the program is not valid.

61. The method of claim 60, wherein the structure stores the execute permission indicators in a hardware structure, the method further comprising inspecting the hardware data structure to determine if the execute permission indicator indicates whether the page of memory is valid.

62. The method of claim 61, further comprising receiving a fault generated by the at least one processor, the fault being generated when the program attempts to execute the instruction on the page of memory in which the indicator for the page of memory does not indicate the page of memory is valid, wherein the verifying is performed upon receiving the fault.

63. The method of claim 60, further comprising:
  setting access control indicators for pages of memory marked as valid by the execute permission indicators;
  determining a modification to a page of memory marked as valid, the modification violating the access control indicator for the page of memory; and
  changing the execute permission indicator for the modified page of memory to indicate that the modified page of memory is not valid in response to determining the modification.

64. The method of claim 63, wherein the access control indicator indicates the page of memory is read-execute only.

65. The method of claim 60, wherein the structure comprises a software data structure, the method further comprising inspecting the software data structure to determine if the execute permission indicator indicates whether the page of memory is valid.

66. The method of claim 60, wherein the computer includes a virtual machine running in a direct execution mode on an underlying hardware platform via an intermediate software layer.

67. A method for protecting a computer from unauthorized code, the computer including at least one processor that executes instructions stored in a memory, the memory being organized into separately addressable pages of memory, the method comprising:
  during execution of a program having a series of computer-executable instructions being executed by the at least one processor, determining one or more pages of memory from the separately addressable pages of memory to translate;
  verifying, before the one or more pages of memory are stored in a translation lookaside buffer, that the one or more pages of memory are valid, the one or more pages of memory being valid when the one or more pages of memory do not include unauthorized code;
  storing the one or more pages of memory in a translation lookaside buffer;
  determining an instruction for execution;
  determining if the instruction is found in a page of memory stored in the translation lookaside buffer; and
  if the instruction is found in a page of memory stored in the translation lookaside buffer, executing the instruction without verifying of the page of memory.

68. The method of claim 67, further comprising setting one or more access control indicators for the one or more pages of memory stored in the translation lookaside buffer.

69. The method of claim 68, wherein the one or more access control indicators indicate the one or more pages are read-execute only.

70. The method of claim 69, wherein upon a write to a page of memory of the one or more pages of memory, the method further comprising:
  removing the page of memory from the translation lookaside buffer, wherein verifying is performed before the page of memory is re-stored in the translation lookaside buffer.

71. The method of claim 67, wherein:
  the computer includes a virtual machine (VM) running on an underlying hardware platform via an intermediate software layer; and
  the series of instructions comprise VM-is sued instructions issued in conjunction with binary translation of any of the VM-issued instructions, wherein it is determined if the VM-issued instructions are found in a page of memory stored in the translation lookaside buffer.

* * * * *